US007931246B2

(12) United States Patent
Brewer et al.

(10) Patent No.: US 7,931,246 B2
(45) Date of Patent: Apr. 26, 2011

(54) VEHICLE SEAT TRACK

(75) Inventors: William S. Brewer, Pinckney, MI (US); Ganesh T. Ramaseshadri, Ypsilanti, MI (US); Michael Leighton, LaSalle (CA); Simon Moore, Brighton, MI (US); Stephen P. Telesco, Dexter, MI (US)

(73) Assignee: Johnson Controls Technology Company, Holland, MI (US)

( * ) Notice: Subject to any disclaimer, the term of this patent is extended or adjusted under 35 U.S.C. 154(b) by 587 days.

(21) Appl. No.: 11/665,425

(22) PCT Filed: Nov. 10, 2005

(86) PCT No.: PCT/US2005/040779
§ 371 (c)(1),
(2), (4) Date: Jul. 16, 2008

(87) PCT Pub. No.: WO2006/053145
PCT Pub. Date: May 18, 2006

(65) Prior Publication Data
US 2009/0114793 A1 May 7, 2009

Related U.S. Application Data

(60) Provisional application No. 60/627,429, filed on Nov. 12, 2004.

(51) Int. Cl.
*F16M 13/00* (2006.01)
(52) U.S. Cl. .................................. 248/429; 248/430
(58) Field of Classification Search .............. 248/429, 248/430, 424, 423; 296/64, 65.01; 74/527, 74/538; 297/216.17, 216.18, 216.19
See application file for complete search history.

(56) References Cited

U.S. PATENT DOCUMENTS 4,720,072 A 1/1988 Kitano et al.
4,720,073 A * 1/1988 Mann et al. ................ 248/430
(Continued)

FOREIGN PATENT DOCUMENTS

DE 42 42 895 C1 11/1993
(Continued)

OTHER PUBLICATIONS

European Office Action mailed Apr. 9, 2008 in European Application No. 05 849 395.8, 6 pages.
(Continued)

*Primary Examiner* — Anita M King
(74) *Attorney, Agent, or Firm* — Foley & Lardner LLP

(57) ABSTRACT

A track assembly for a vehicle seat includes a first track (22) having a first portion and a second track (24) coupled to the first track (22). The track assembly also includes a first set (104,106) and a second set (108, 110) of friction reducing members provided at first and second locations between the first track and the second track to facilitate sliding movement of the second track (24) relative to the first track (22). A device for preventing the sliding movement of the second track is provided that includes a pin configured to lock the second track in place relative to the first track by engaging a first portion (38) of the first track (22), a first portion (68) of the second track (24), and a second portion (70) of the second track (24). The pin extends between the first set (104) of friction reducing members and the second set (106) of friction reducing members when the second track is prevented from sliding.

21 Claims, 22 Drawing Sheets

U.S. PATENT DOCUMENTS

| | | | |
|---|---|---|---|
| 5,806,825 A * | 9/1998 | Couasnon | 248/429 |
| 5,931,436 A | 8/1999 | Rohee et al. | |
| 5,941,495 A * | 8/1999 | Bauer et al. | 248/430 |
| 6,059,248 A * | 5/2000 | Bauer et al. | 248/430 |
| 7,207,541 B2 * | 4/2007 | Frohnhaus et al. | 248/429 |
| 7,661,646 B2 * | 2/2010 | Weber | 248/429 |
| 7,677,520 B2 * | 3/2010 | Beneker et al. | 248/430 |
| 7,722,006 B2 * | 5/2010 | Beneker et al. | 248/424 |
| 2002/0060281 A1 | 5/2002 | Okazaki et al. | |
| 2004/0222347 A1 | 11/2004 | Oh | |
| 2008/0163717 A1 * | 7/2008 | Weber | 74/527 |

FOREIGN PATENT DOCUMENTS

WO  WO 2005/021319 A    3/2005

OTHER PUBLICATIONS

International Preliminary Report on Patentability mailed May 15, 2007 in PCT/US2005/040779, 8 pages.

International Search Report mailed Mar. 24, 2006 in PCT/US2005/040779, 3 pages.

\* cited by examiner

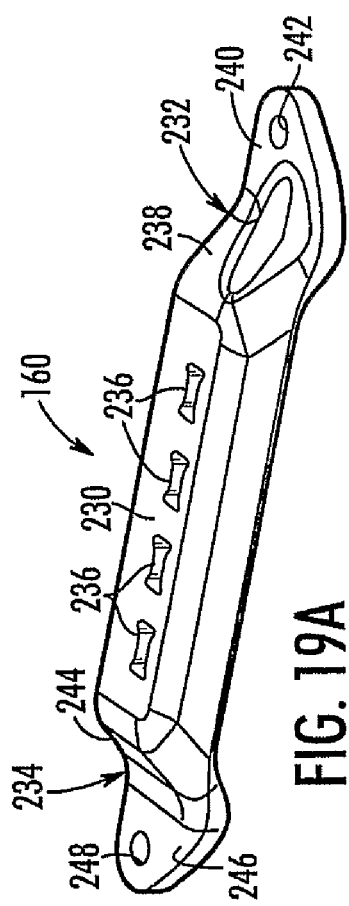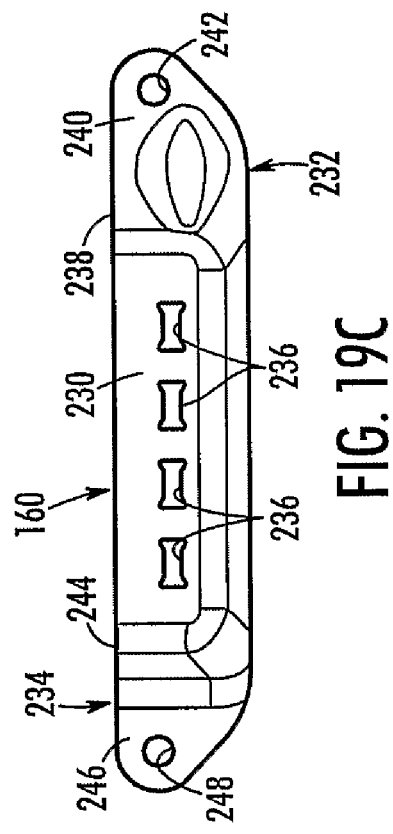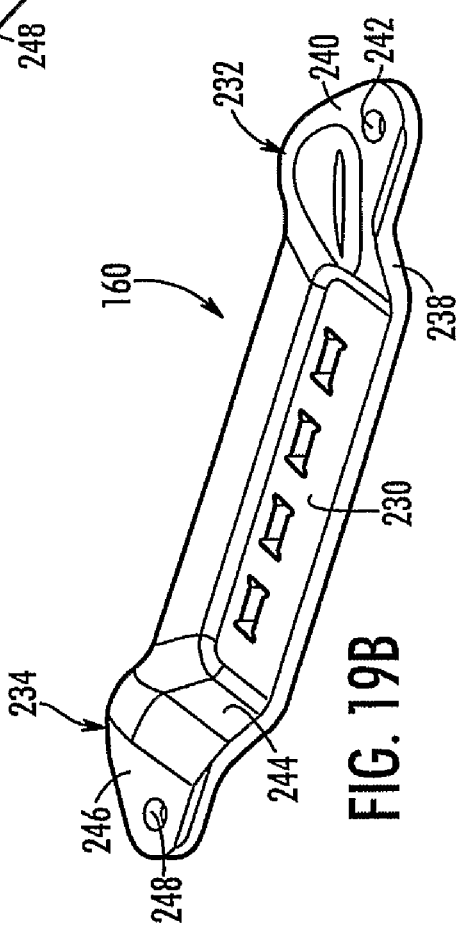

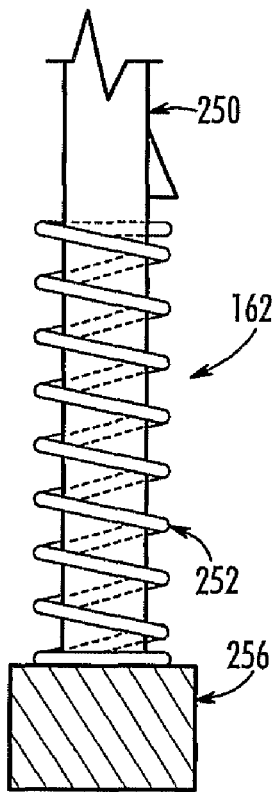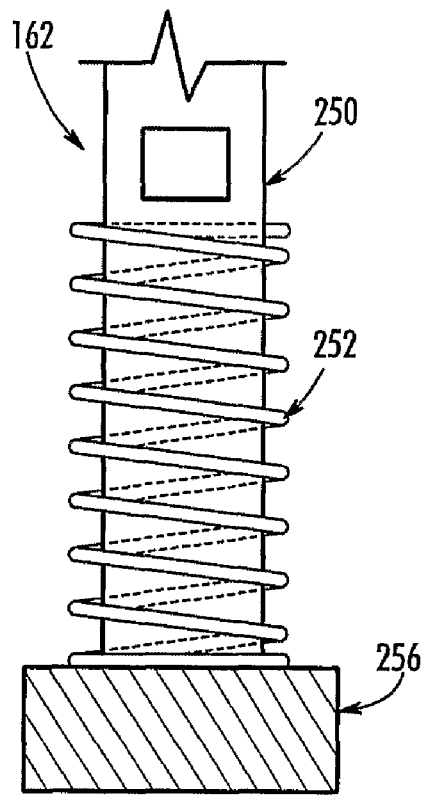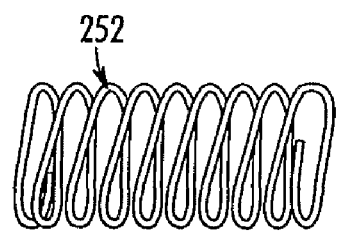
FIG. 22A
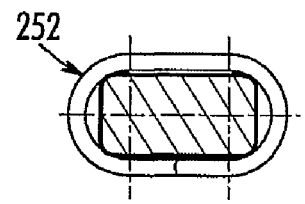
FIG. 22B
FIG. 20B
FIG. 20A

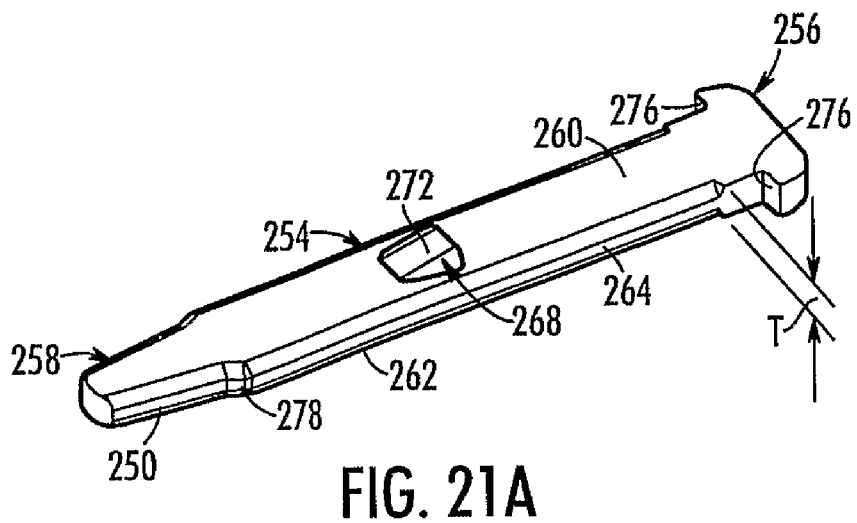
FIG. 21A
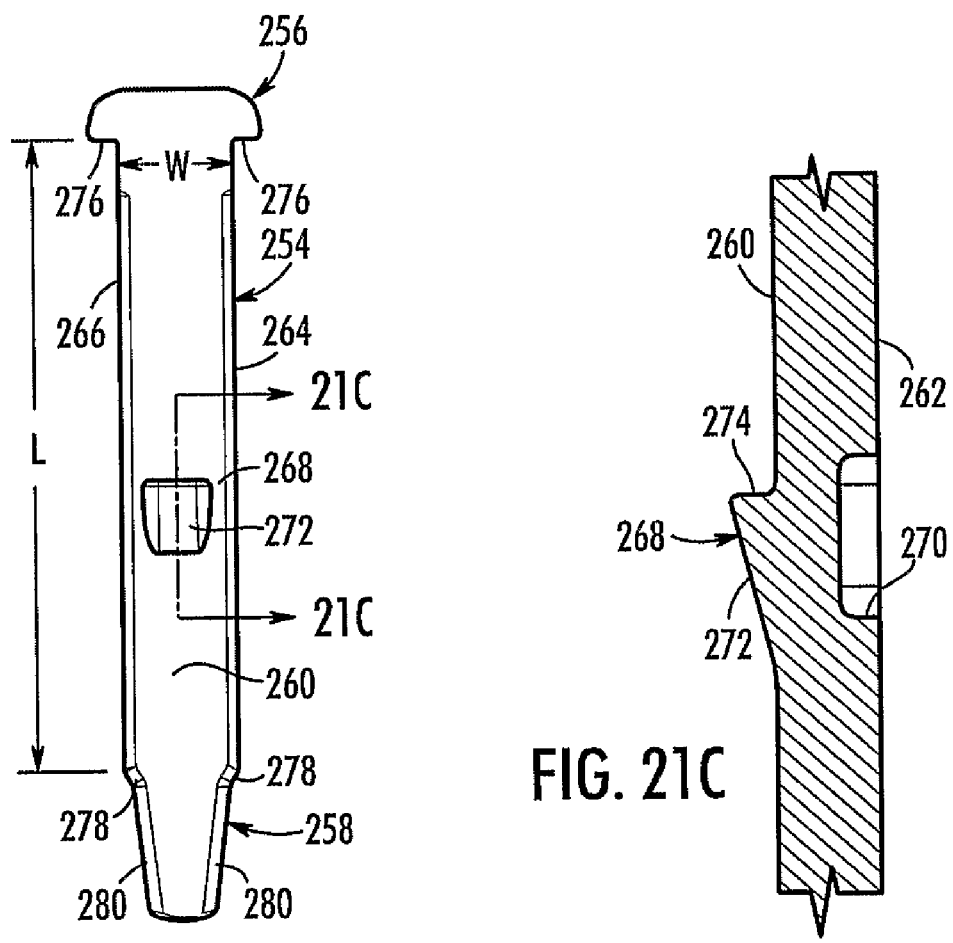
FIG. 21C
FIG. 21B

VEHICLE SEAT TRACK

CROSS-REFERENCE TO RELATED APPLICATIONS

This application claims the benefit of U.S. Provisional Patent Application No. 60/627,429 filed Nov. 12, 2004, the entire disclosure of which is incorporated by reference herein.

BACKGROUND

The present invention relates generally to the field of adjustable vehicle seat assemblies. More particularly, the present invention relates to the field of track systems or arrangements for use with adjustable vehicle seat assemblies.

Vehicle seat assemblies are typically provided with a track system that enables the position of the seat assembly within a motor vehicle to be adjusted in the forward and reward direction. Such adjustment capability is desirable to enable vehicle operators of various sizes to be seated comfortably and safely within the motor vehicle. Such seat assemblies typically include two or more tracks that move relative to one another and a latching mechanism that releasably retains the tracks (and therefore the seat assembly) in a locked position relative to one another until the latch mechanism is released. Once the latch mechanism is released, the tracks can be moved relative to one another, which allows the occupant of the seat assembly to adjust the position of the seat assembly and to then reengage or release the latching mechanism to hold the seat in the new location.

Latch mechanisms typically retain the seat assembly in a particular position by inserting a pin through apertures and/or slots that are provided in or on the tracks that make up the track system, which has the effect of locking the tracks in position with respect to one another. To unlock the tracks and allow the occupant of a seat to adjust the position of the seat, the pin is removed from the apertures. Often times, the apertures or slots of at least one of the tracks are provided on a separate structure that is coupled to the track. This separate structure is an extra piece of the track system that generally increases the cost and weight of the track system, and which may reduce the durability of the track system.

In some track systems, the slot or slots used in the system are not completely enclosed (e.g., surrounded by material on all sides), but rather extend to the edge of the structure in which they are incorporated to form a series of teeth or fingers between the slots. Because there is no material joining the distal ends of the teeth or fingers, the strength and rigidity of the slots may be less than desirable. Moreover, this slot configuration may limit the methods that may be used to manufacture the component or tracks having such slots.

In other track systems, the apertures or slots of one or more of the tracks are located on a portion of the track that is relatively unsupported when the track is coupled to the other track or tracks of the track system. Accordingly, this portion of the track, and therefore the apertures provided on this portion of the track, may introduce a certain degree of instability into the track system and may allow one or more of the components of the track system to become at least partially out of position.

In many track systems, the latch mechanism that is used in conjunction with the track system must be located above or below the tracks and the pins or fingers of the latch assembly are generally vertically oriented. This is often the result of the configuration of the tracks, which makes placing the latch mechanism to the side of the tracks impractical. However, the placement of the latch mechanism above or below the tracks is often inconvenient due to space restraints and may make the coupling of the track system to the vehicle seat more difficult. The vertically oriented pins or fingers may also be at least partially affected by the vertical accelerations to which the vehicle is subjected during its normal operation, which increases the likelihood of buzzes, squeaks, and rattles within the track system.

A variety of different types of latching mechanisms may be used in seating assemblies. For example, the latching mechanism used in a seat assembly may be a pawl-type mechanism, it may be a positive engagement-type latching mechanism, or it may be one of a variety of other types of latching mechanisms. On the other hand, rather than a latching mechanism, the seat assembly may be power operated and therefore may rely on one or more drive motors to adjust the position of the seat assembly and retain it in a desired location. Depending on the type of latch mechanism or powering apparatus used in a particular seat assembly, the shape (e.g., the cross-sectional shape) of the tracks used in connection with the particular seat assembly often must be varied to accommodate the specific type of latch mechanism or powering apparatus. Thus, the known tracks of seat assemblies used in conjunction with a pawl-type latch mechanism have a different shape than the tracks used in conjunction with a positive engagement-type latch mechanism or a power source (such as those used in powered seats). The need for differently shaped tracks for each type of latching mechanism generally increases design costs and reduces the flexibility of being able to utilize different latching mechanisms or powering apparatuses.

Accordingly, there is a need to provide a reliable, widely acceptable seat track system or arrangement for providing translational adjustment, which avoids one or more of the above-referenced and other problems.

SUMMARY

An exemplary embodiment relates to a track assembly for a vehicle seat that includes a first track having a first portion and a second track coupled to the first track, the second track having a first portion and a second portion, the first portion of the first track provided between the first and second portions of the second track. The track assembly also includes a first set of friction reducing members provided at a first location between the first track and the second track to facilitate sliding movement of the second track relative to the first track and a second set of friction reducing members provided between the first track and the second track to facilitate sliding movement of the second track relative to the first track. The track assembly further includes a device for preventing the sliding movement of the second track, the device comprising a pin configured to lock the second track in place relative to the first track by engaging the first portion of the first track, the first portion of the second track, and the second portion of the second track. The pin extends between the first set of friction reducing members and the second set of friction reducing members when the second track is prevented from sliding.

Another exemplary embodiment relates to a track assembly for a vehicle seat that includes a first track comprising an upwardly facing channel, a first downwardly facing channel, and a second downwardly facing channel, the upwardly facing channel provided between and in communication with the first and second downwardly facing channels. The track assembly also includes a second track configured for sliding movement relative to the first track and comprising a downwardly facing channel, a first upwardly facing channel, and a second upwardly facing channel, the downwardly facing channel of the second track provided between and not in communication with the first and second upwardly facing channels. The upwardly facing channel of the first track is generally aligned with the downwardly facing channel of the second track. A first portion of the second track is received within the first downwardly facing channel of the first track, and a second portion of the second track is received within the second downwardly facing channel of the first track. Four sets of bearings are provided between the first track and the second track to facilitate the sliding movement of the second track. A first set and a second set of bearings of the four sets of bearings are provided adjacent the first portion of the second track and a third set and a fourth set of the four sets of bearings are provided adjacent the second portion of the second track. The first set of bearings is separated from the second set of bearings by a first distance and the third set of bearings is separated from the fourth set of bearings by a second distance, the first distance being greater than the second distance.

BRIEF DESCRIPTION OF THE DRAWINGS

FIGS. 19A and 19B are perspective views of a back plate of the latch assemblies of the track system of FIG. 8.

FIG. 19C is a side elevational view of the back plate of FIGS. 19A and 19B.

FIGS. 20A and 20B are simplified top and side elevational views, respectively, of a pin assembly of the latch assemblies of the track system of FIG. 8.

FIG. 21A is a perspective view of a pin of the latch assemblies of the track system of FIG. 8.

FIG. 21B is a top view of the pin of FIG. 21A.

FIG. 21C is a partial cross-sectional view of the pin of FIG. 21A taken along lines 21C-21C in FIG. 21B.

FIGS. 22A and 22B are perspective and top views, respectively, of a spring of the pin assembly of FIGS. 20A and 20B.

DETAILED DESCRIPTION

Before providing the description of the exemplary embodiments of the track systems, it should be noted that references to "outer," "inner," "intermediate," "above," "below," "upper," "lower," "left," or "right" in this description are merely used to identify the various elements as they are oriented in the figures or as they may be oriented in one or more particular embodiments of the track system. These terms are not meant to limit the element which they describe, as the various elements may be oriented or arranged differently in various track systems.

Figure 1:
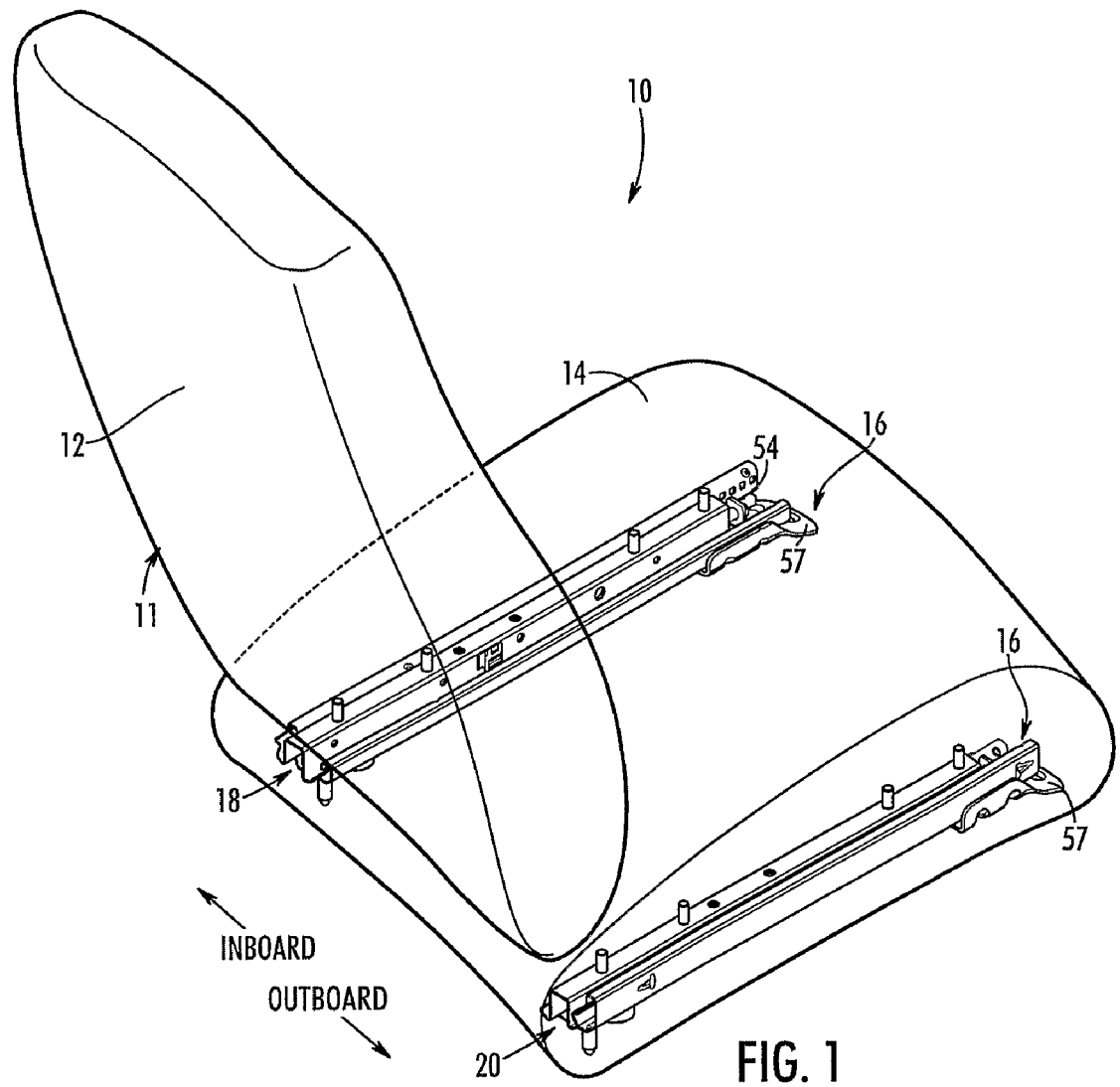
FIG. 1 is a perspective view of a seat assembly according to one exemplary embodiment.

Referring to FIG. 1, a seat assembly 10 is shown according to one exemplary embodiment. Seat assembly 10 includes a seat 11 and a track system 16. Seat 11 generally includes a back portion 12 and a seat cushion portion 14, which each may take any one of a variety of well known configurations. Track system 16 is generally configured to enable an occupant of seat 11 to adjust the position of seat 11 in the translational (i.e., forward and rearward) direction.

Figure 2:
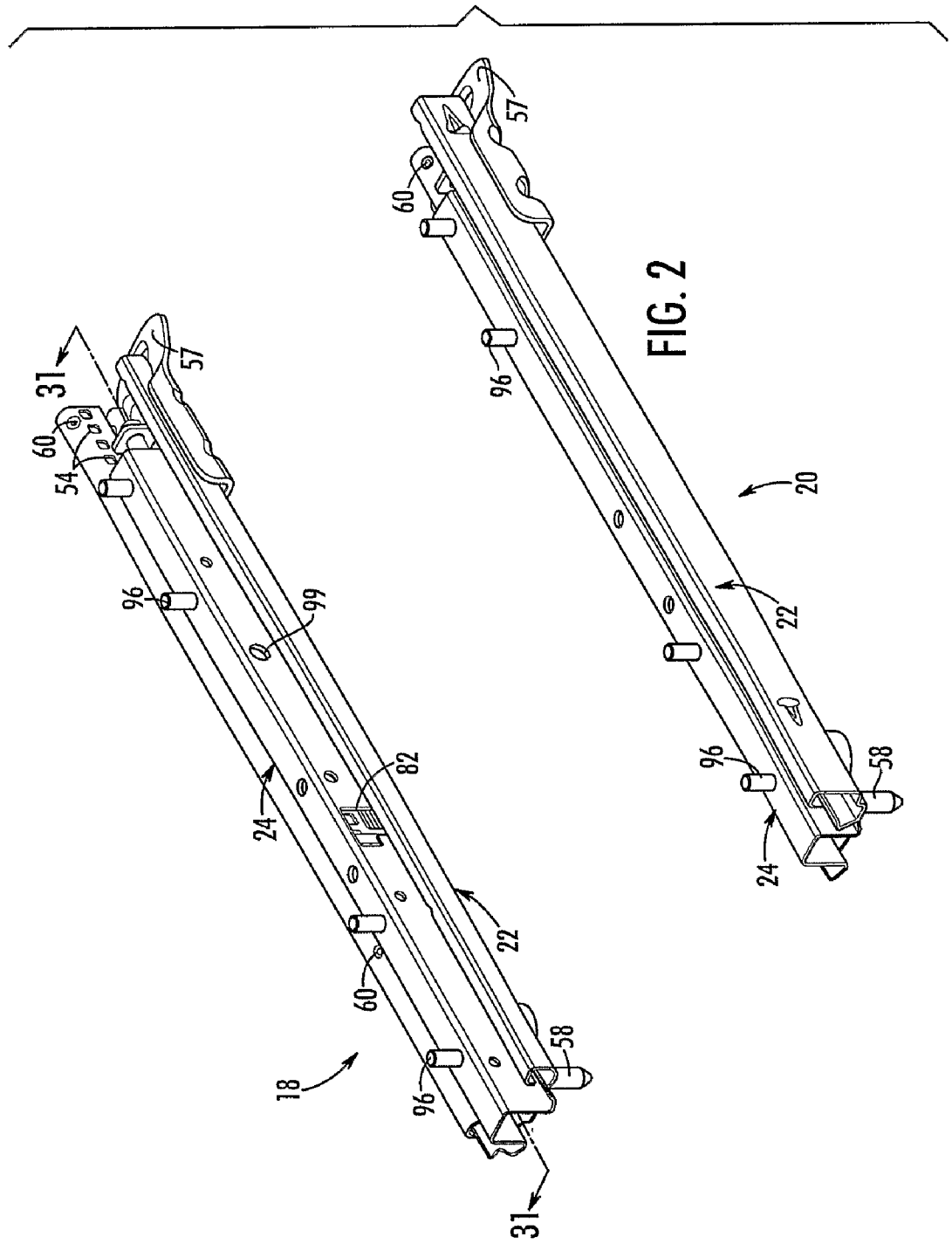
FIG. 2 is a perspective view of the track system of the seat assembly of FIG. 1.
Figure 8:
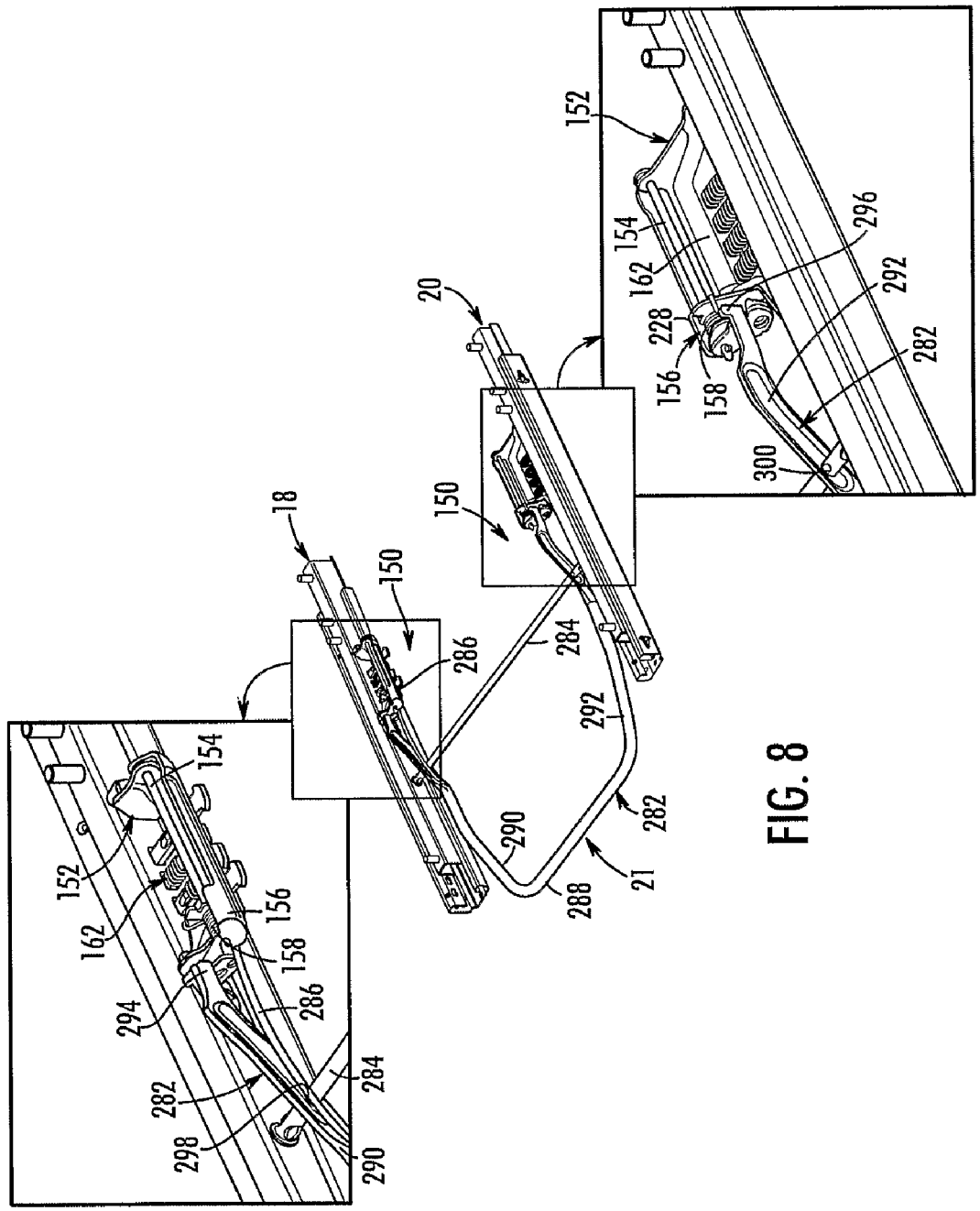
FIG. 8 is a perspective view of a track system including latch assemblies according to another exemplary embodiment, with the portions of the track system proximate the latch assemblies shown enlarged.
Figure 28:
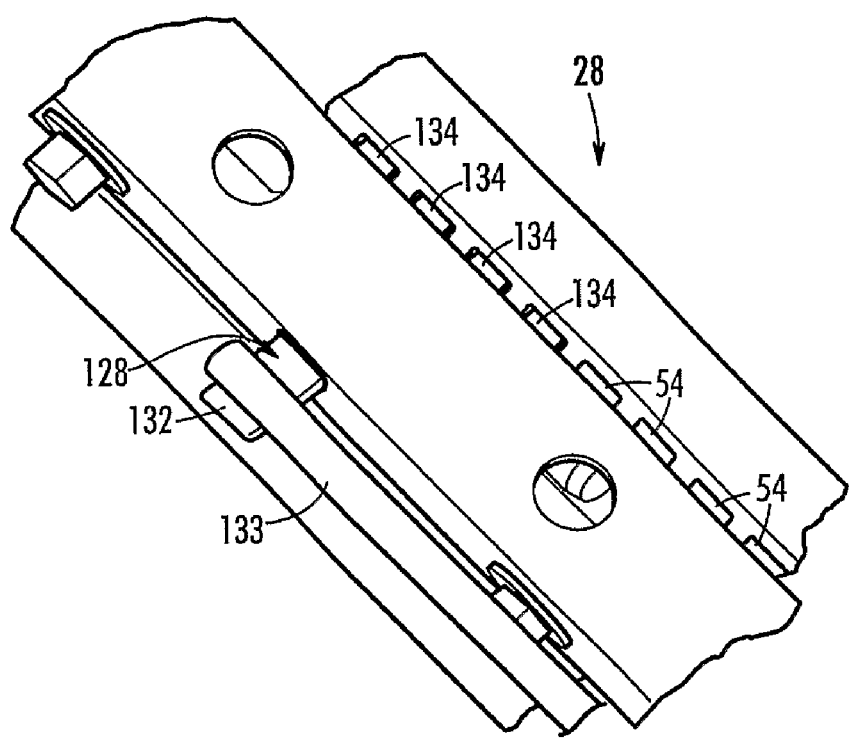
FIG. 28 is a top perspective view of a portion of a track arrangement including a latch assembly according to another exemplary embodiment.

Referring now to FIGS. 1 and 2, track system 16 includes an inboard track arrangement 18, an outboard track arrangement 20, and a lever assembly 21 (FIG. 8). Inboard track arrangement 18 and outboard track arrangement 20 are coupled to seat cushion portion 14 of seat 11 in a generally spaced-apart and parallel relationship, with inboard track arrangement 18 being located proximate the inboard side of seat cushion portion 14 and outboard track arrangement 20 being located proximate the outboard side of seat cushion portion 14. Lever assembly 21 is generally located between inboard track arrangement 18 and outboard track arrangement 20 in a location that allows an occupant of seat 11 to actuate lever assembly 21. Track arrangements 18 and 20 and lever assembly 21 are configured to cooperate together to allow for the movement or translation of seat 11 relative to the general structure to which seat 11 is coupled, such as the floor of a automobile, when the occupant of seat 11 actuates lever assembly 21. Track arrangement 20 is generally identical to track arrangement 18, except that track arrangement 20 is a mirror image of track arrangement 18. Accordingly, the same reference numbers will be used to refer to like components of track arrangement 20 and track arrangement 18. For simplicity, only track arrangement 18 will be described below, it being understood that the description applies equally to track arrangement 20. Track arrangement 18 includes a lower track 22, an upper track 24, friction reducing members 26 (FIG. 3), and a latch assembly 28 (FIG. 28).

Figure 3:
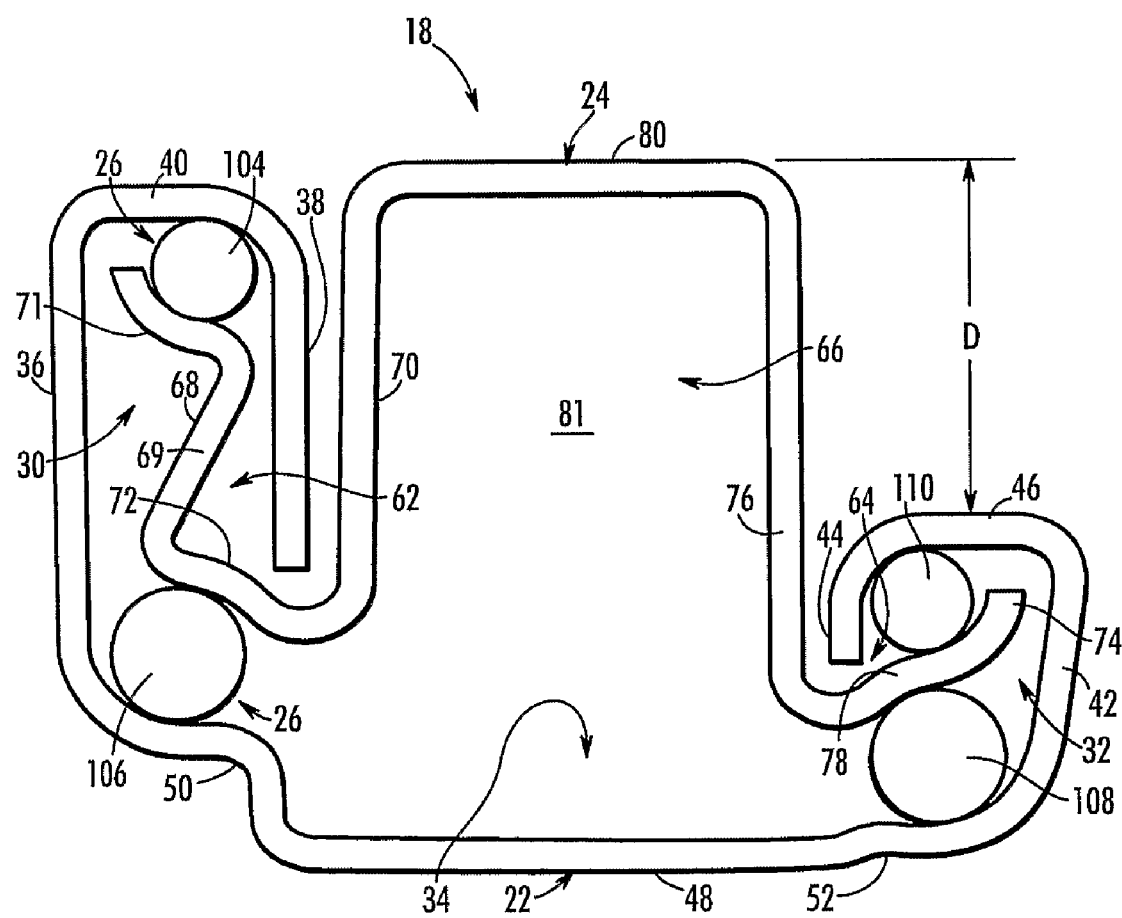
FIG. 3 is a simplified, cross-sectional view of a track arrangement according to one exemplary embodiment.

Referring now to FIGS. 2-5, lower track 22 (e.g., track, rail, slide, guide, etc.) is an elongated and generally rigid member that is configured to be coupled to a structure, such as the floorboard of an automobile, and to generally serve as a guide for upper track 24. According to one exemplary embodiment, lower track 22 is an asymmetrical track that includes an outer channel 30, an inner channel 32, and an intermediate channel 34. As shown in FIG. 3, the intermediate channel 34 is in communication with the outer channel 30 and the inner channel 32. It should be noted that the terms "outer" and "inner" as used in connection with the upper and lower tracks are intended to refer to the relative position of the particular component or feature of the tracks relative to the center of the seat to which the tracks are coupled.

As best shown in FIG. 3, outer channel 30 is a generally U-shaped channel that faces downwardly. Outer channel 30 is formed by two generally vertical sidewalls 36 and 38 (the two legs of the "U") that are joined together by a generally horizontal intermediate wall 40 (the base of the "U"). The location of intermediate wall 40 above the base of lower track 22 defines the height of channel 30.

Similarly, inner channel 32 is a generally U-shaped channel that faces downwardly. Inner channel 32 is formed by two generally vertical sidewalls 42 and 44 (the two legs of the "U") that are joined together by a generally horizontal intermediate wall 46 (the base of the "U"). The location of intermediate wall 46 above the base of lower track 22 defines the height of channel 32, which is roughly half the height of channel 30.

Intermediate channel 34 is a generally upwardly facing, U-shaped channel (with one leg being longer than the other) that is formed by sidewall 38 of channel 30 (the longer leg of the "U"), sidewall 44 of channel 32 (the shorter leg of the "U"), and a generally horizontal intermediate wall or base 48 (the base of the "U") that extends between, and couples to, sidewall 36 of channel 30 and sidewall 42 of channel 32. According to one exemplary embodiment, the area in which base 48 transitions into sidewall 36 includes a step 50 that generally serves to raise the intersection between base 48 and sidewall 36 in order to provide a suitable support surface for a friction reducing member (discussed below). A similar, although smaller and more gradual, step 52 is also provided in the area in which base 48 transitions into sidewall 42. Like step 50, step 52 generally serves to raise the intersection between base 48 and sidewall 42 in order to provide a suitable support surface for a friction reducing member discussed below.

According to one exemplary embodiment, the transition or intersection between each of the walls of lower track 22 is generally radiused. According to various exemplary embodiments, the magnitude of the radius between the different walls may vary. For example, according to one exemplary embodiment, the radius at the intersection between sidewall 36 and intermediate wall 40 of channel 30 is less than the radius at the intersection between intermediate wall 40 and sidewall 38 of channel 30. The magnitude of the radius of each transition may be influenced by one or more of a variety of factors, including manufacturing considerations as well as the need to provide a surface that is suitable to receive a bearing or other friction reducing apparatus. According to other exemplary embodiments, the intersection or transition between each of the walls of the lower track may be radiused, tapered, may be a sharp corner, or may be an otherwise gradual or sharp transition or combination thereof. According to other exemplary embodiments, different intersections may have different transition characteristics. For example, one intersection may be radiused while another intersection may have a generally sharp corner.

Figure 4:
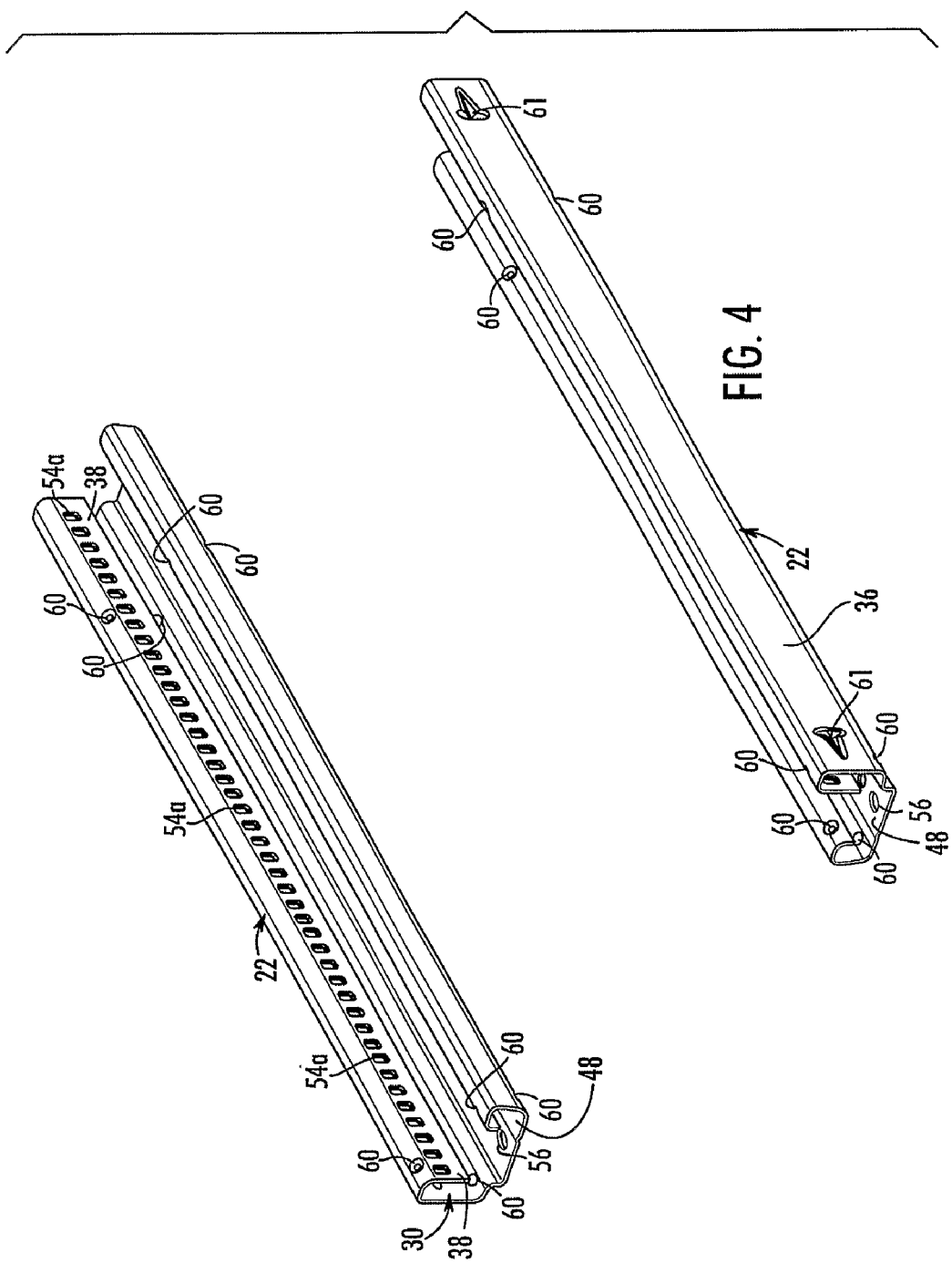
FIG. 4 is a perspective view of a pair of lower tracks of a track system according to another exemplary embodiment.
Figure 5:
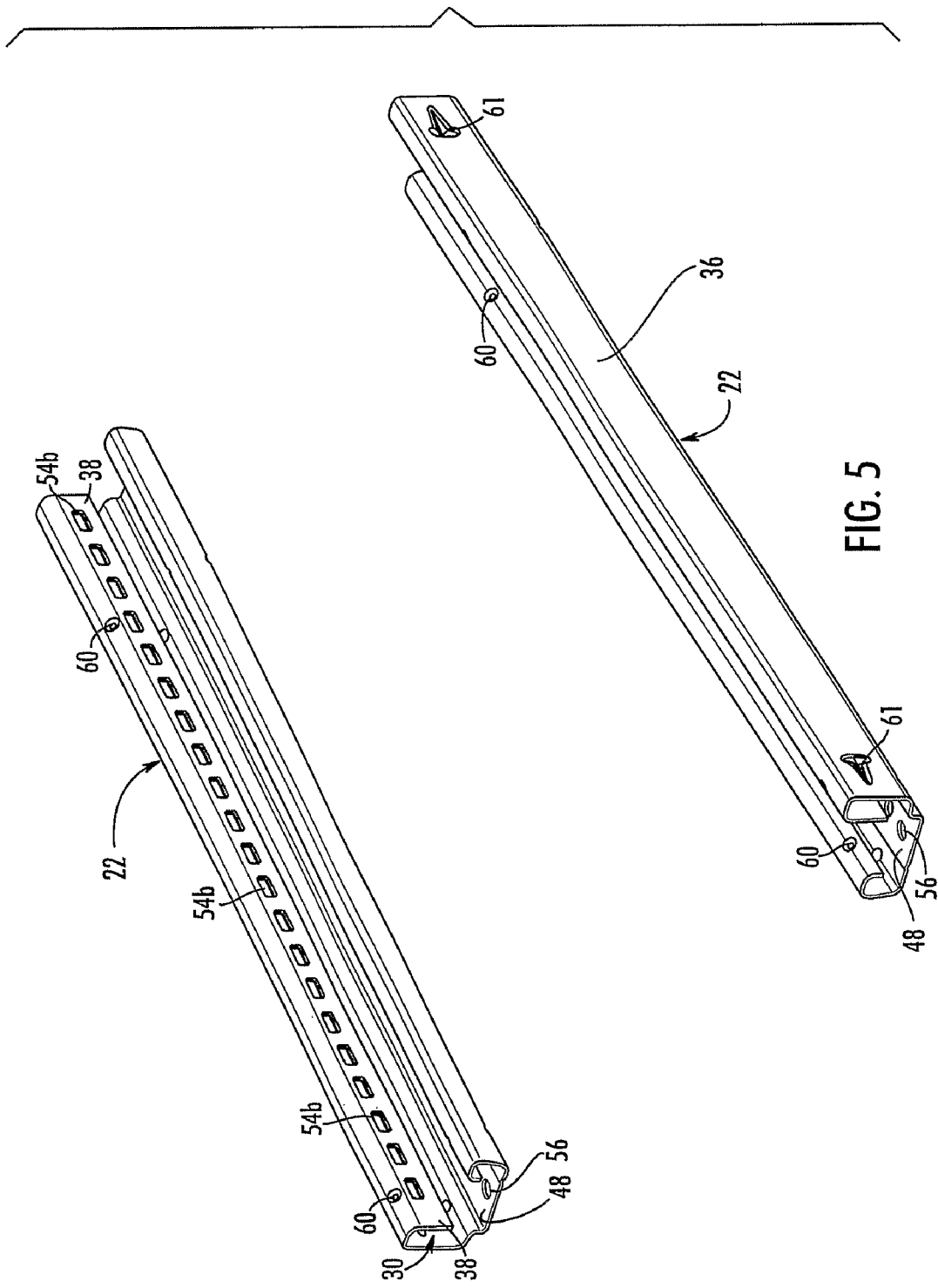
FIG. 5 is a perspective view of a pair of lower tracks of a track system according to another exemplary embodiment.

Referring now to FIGS. 4 and 5, sidewall 38 of channel 30 includes a series of apertures 54 (e.g., latch windows, openings, holes, slots, etc.) that are uniformly spaced along the length of lower track 22. Apertures 54 are generally configured to receive a portion of latch assembly 28 (FIG. 28) and to thereby retain latch assembly 28 (and upper track 24) in its position relative to lower track 22 until the latch assembly is released (e.g., until the portion of latch assembly 28 received within one or more of apertures 54 is removed from apertures 54). The shape, size, spacing, and other characteristics of apertures 54 may vary, depending at least in part on the type of latching assembly that is used in track arrangement 18. As illustrated in FIG. 4, apertures 54a are generally vertically aligned, rectangular openings that are relatively closely spaced and that are surrounded on all sides by the material of lower track 22. Such a configuration of apertures is generally suited for use with the pawl-type latch illustrated in FIGS. 28 and 29. According to an exemplary embodiment illustrated in FIG. 5, apertures 54b are generally horizontally aligned, rectangular openings that are spaced further apart than apertures 54a illustrated in FIG. 5 and that are surrounded on all sides by the material of lower track 22. Such a configuration of apertures is generally suited for use with the positive engagement-type latches illustrated in FIGS. 8-27. According to other exemplary embodiments, the apertures in the lower track may take one or more of a variety of different shapes, sizes, and configurations depending on the characteristics of the latch mechanism that is configured to engage the apertures. According to other exemplary embodiments, the lower track may not include a series of apertures in the sidewall, as other means of releasably retaining the upper track in a particular position with respect to lower track may be provided that do not require such openings. For example, if the movement of the upper track relative to the lower track is controlled by a powered mechanism, such as a power screw driven by an electric motor, such a mechanism may be able to releasably retain the upper track in a particular position with respect to the lower track without such apertures and the latch assembly.

As best shown in FIGS. 2, 4, 5, 30, and 31, intermediate wall or base 48 of lower track 22 includes apertures 56, which are configured to receive one of a variety of different coupling members, fasteners, or structures (e.g., pins, studs, rivets, dowels, bolts, etc.) that may be used to couple lower track 22 to the floor of an automobile (or one of a variety of other structures). One example of such a coupling member is pin or stud 58 (see FIGS. 2, 30, and 31) which extends through aperture 56 and which is configured to couple to the floor of an automobile. According to other exemplary embodiments, the apertures in the base of the lower track may vary in number, size, shape, and configuration in order to allow the lower track to be coupled to one or more of a variety of different structures using one or more of a variety of different structures. To assist in the coupling of lower track 22 to the vehicle floor, a foot 57 as shown in FIG. 2, which is configured to be coupled to the vehicle floor, is coupled to the front of lower track 22.

Referring now to FIGS. 2-5, lower track 22 also includes a plurality of projections (e.g., ball stops, indentations, recesses, extensions, protrusions, etc.) shown as stops 60 that generally extend inwardly from locations around the cross-section of lower track 22 that correspond to the channels or spaces formed between lower track 22 and upper track 24 (discussed below) that are configured to receive friction reducing members or bearings 26. Each of stops 60 extends into its corresponding bearing channel by a distance that is sufficient to stop a bearing from traveling beyond stop 60 when the bearing comes into contact with stop 60 but not so far that it otherwise interferes with the movement of upper track 24 relative to lower track 22. According to one exemplary embodiment, lower track 22 includes a set of stops 60 proximate the front of lower track 22 and one set of stops 60 proximate the rear of lower track 22. Each set of stops 60 includes a stop 601) at the intersection between intermediate wall 40 and sidewall 38 of channel 30, ii) at the intersection between intermediate wall 46 and sidewall 44 of channel 32, iii) at the intersection between base 48 and sidewall 36 of channel 30, and iv) at the intersection between base 48 and sidewall 42 of channel 32. According to other exemplary embodiments, the lower track may include more or less than two sets of stops, and each set of stops may include more or less than four individual stops in one or more of a variety of different locations around the cross-section of the lower track depending on the number and location of the bearings and the bearing channels or spaces. According to other exemplary embodiments, each stop may be a separate element that is coupled to the lower track, or the stops may be integrally formed (e.g. punched, stamped, deflected, etc.) with the rest of the lower track.

Lower track 22 also includes two projections (e.g., indentations, recesses, extensions, protrusions, ledges, etc.) shown as stops 61 that generally extend inwardly from sidewall 36 of channel 30 near each end of lower track 22. Stops 61 are configured to contact corresponding structures on upper track 24 to limit the extent to which upper track 24 may move relative to lower track 22. The maximum forward and rearward positions of upper track 24 relative to lower track 22 may be adjusted by adjusting the position of stops 61 of lower track 22 and/or the corresponding structures (described below) of upper track 24. According to other exemplary embodiments, each stop may be a separate element that is coupled to the lower track, or the stops may be integrally formed (e.g. punched, stamped, deflected, etc.) with the rest of the lower track.

Referring now to FIGS. 2, 3, 6, and 7, upper track 24 (e.g., track, rail, slide, etc.) is an elongated and generally rigid member that is configured to be coupled to lower track 22 in a manner that allows upper track 24 to move (e.g., translate or slide) relative to lower track 22. According to one exemplary embodiment, upper track 24 is an asymmetrical track that includes an outer channel 62, an inner channel 64, and an intermediate channel 66. As shown in FIG. 3, the outer channel 62 and inner channel 64 are not in communication with the intermediate channel 66.

Outer channel 62 is a roughly U-shaped channel that faces upwardly. Outer channel 62 is formed by a generally bent sidewall 68 and a generally vertical sidewall 70 (the two legs of the "U") that are joined together by an intermediate wall 72 (the base of the "U") that inclines upwardly as it extends from sidewall 70 to sidewall 68. The generally bent sidewall 68 includes a lower portion 69 that extends upwardly and inwardly (toward sidewall 70) and an upper portion 71 that extends upwardly and outwardly (away from sidewall 70).

Inner channel 64 is a roughly U-shaped, relatively shallow channel (with one leg of the "U" being much longer than the other) that faces upwardly. Inner channel 64 is formed by two generally vertical sidewalls 74 and 76 (the two legs of the "U") that are joined together by an intermediate wall 78 (the base of the "U") that inclines upwardly as it extends from sidewall 76 to sidewall 74. Sidewall 74 is much shorter than sidewall 76 and extends to a height that is much less than the height to which sidewall 76 extends.

Intermediate channel 66 is a generally downwardly facing, U-shaped channel (with one leg being longer than the other) that is formed by sidewall 70 of channel 62 (the shorter leg of the "U"), sidewall 76 of channel 64 (the longer leg of the "U"), and a generally horizontal intermediate wall or top 80 (the base of the "U") that extends between, and couples to, sidewall 70 of channel 62 and sidewall 76 of channel 64.

According to one exemplary embodiment, the transition or intersection between each of the walls of upper track 24 is generally radiused. According to other exemplary embodiments, the magnitude of the radius between the different walls may vary. For example, according to one exemplary embodiment, the radius at the intersection between sidewall 74 and intermediate wall 78 of channel 64 is greater than the radius at the intersection between intermediate wall 78 and sidewall 76 of channel 64. The magnitude of the radius of each transition may be influenced by one or more of a variety of factors, including manufacturing considerations as well as the need to provide a surface that is suitable to receive a bearing or other friction reducing apparatus. According to other exemplary embodiments, the intersection or transition between each of the walls of the upper track may be radiused, tapered, may be a sharp corner, or may be an otherwise gradual or sharp transition or combination thereof. According to other exemplary embodiments, different intersections may have different transition characteristics. For example, one intersection may be radiused while another intersection may have a generally sharp corner.

According to other exemplary embodiments, upper track 24 includes one or more apertures that extend through (or at least partially through) sidewall 76, sidewall 70, and sidewall 68. These apertures are configured to cooperate with latch assembly 28 and to allow a portion of latch assembly 28 to extend though (or at least partially through) the apertures in sidewall 76, sidewall 70, and sidewall 68 (as well as though one or more of apertures 54 of sidewall 38 of lower track 22) to releasably retain upper track 24 in a particular position relative to lower track 22. According to other exemplary embodiments, the size, shape, spacing, and configuration of the apertures in sidewalls 76, 70, and 68 may vary depending on the type of latch assembly that is used with the track arrangement.

Figure 6:
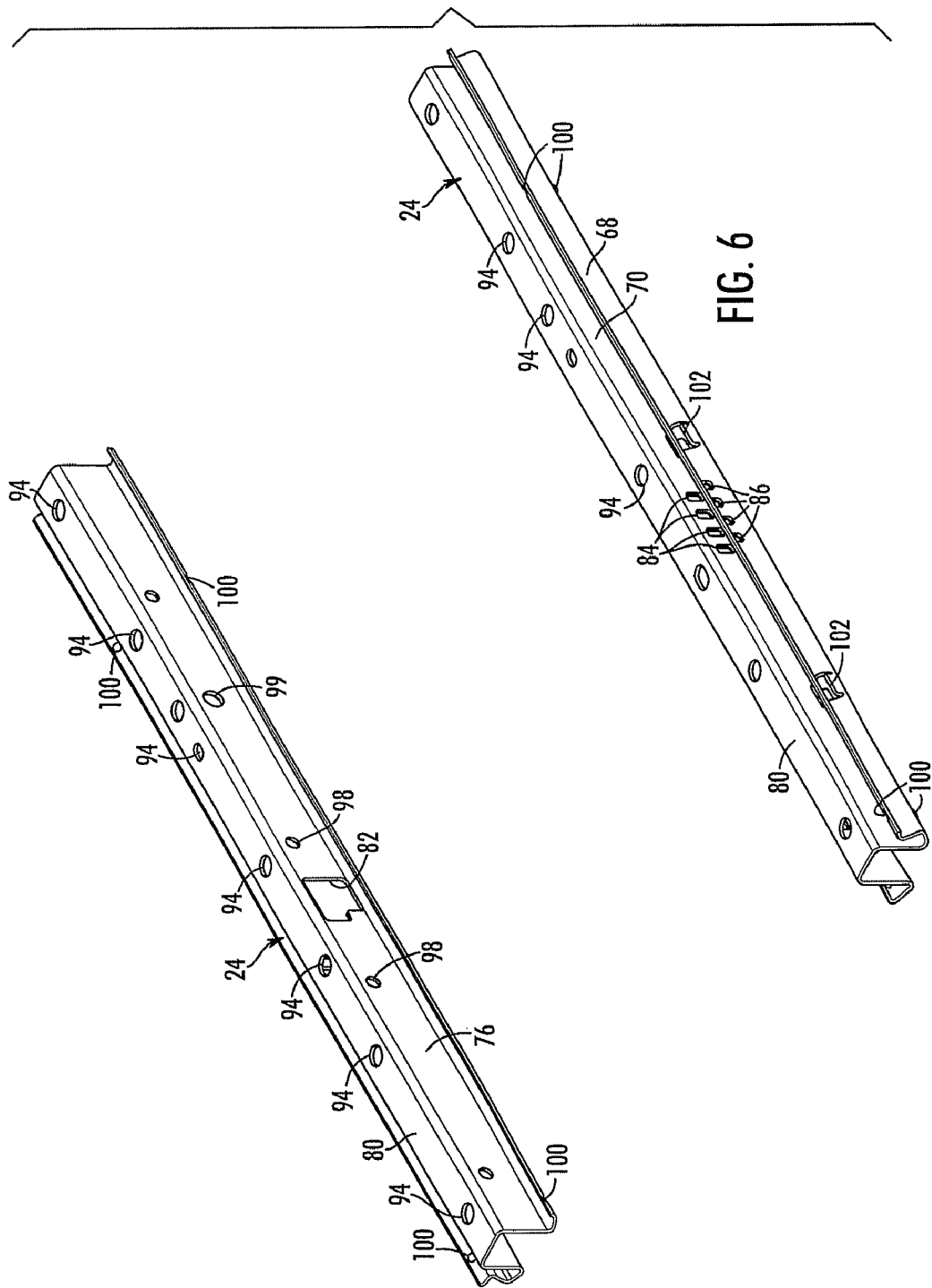
FIG. 6 is a perspective view of a pair of upper tracks of a track system according to another exemplary embodiment.

According to one exemplary embodiment illustrated in FIG. 6, upper track 24 includes a generally "L-shaped" aperture 82 (e.g., latch window, opening, hole, etc.) in sidewall 76, a series of four generally rectangular apertures 84 in sidewall 70, and a series of four generally rectangular apertures 86 in sidewall 68 that are configured to cooperate with a pawl-type latch assembly. Aperture 82, apertures 84, and apertures 86 are generally aligned with one another to enable a portion of latch assembly 28 to extend through sidewalls 76, 70, and 68 and releasably engage one or more of apertures 54 in lower track 22. Aperture 82 has a height that is approximately equal to the height of sidewall 76. Each of apertures 84 and 86 are generally vertically aligned, rectangular openings that correspond to apertures 54a in lower track 22.

Figure 7:
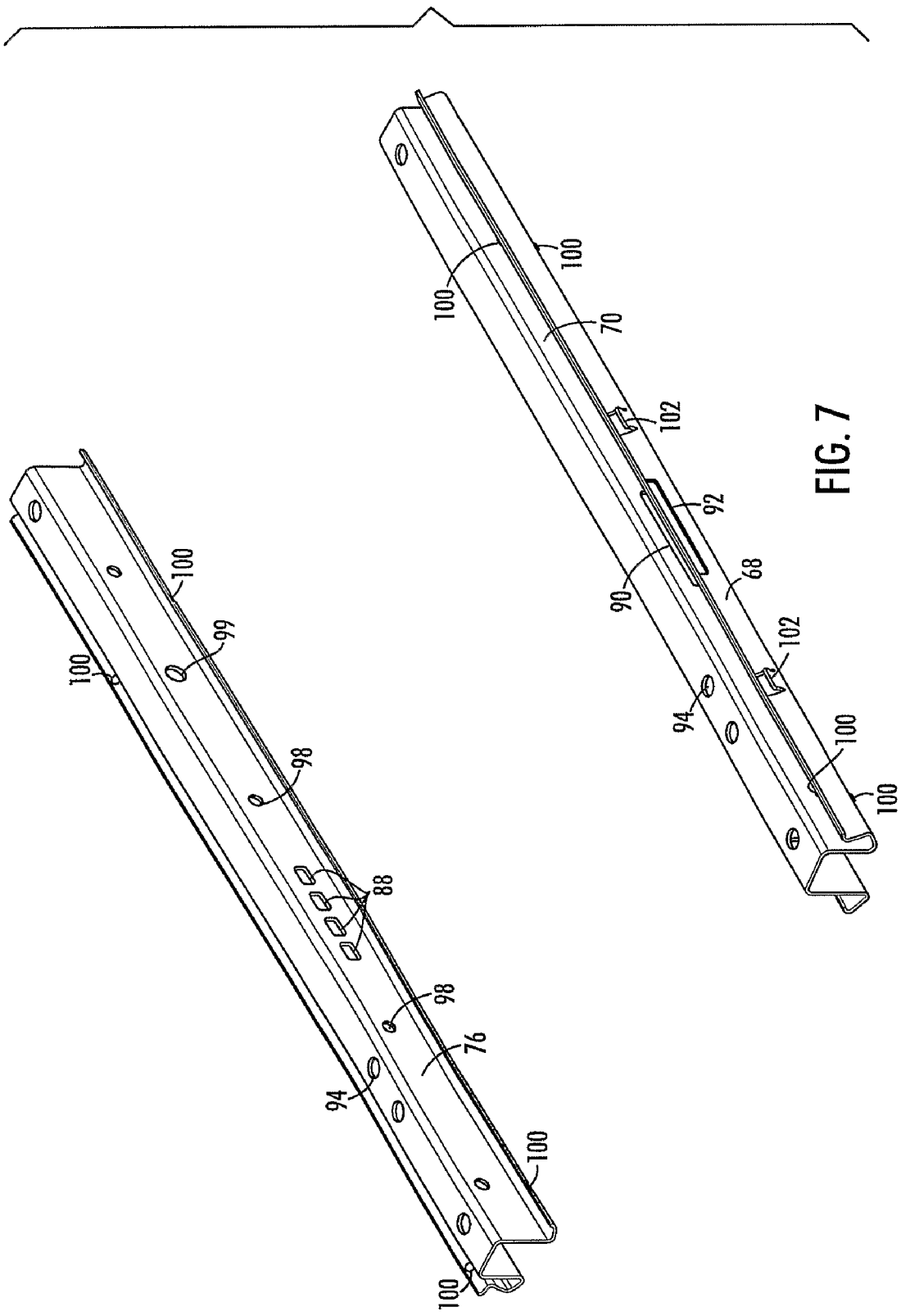
FIG. 7 is a perspective view of a pair of upper tracks of a track system according to another exemplary embodiment.

According to another exemplary embodiment illustrated in FIG. 7, upper track 24 includes a series of four generally rectangular apertures 88 (e.g., latch windows, openings, holes, etc.) in sidewall 76, an aperture 90 in sidewall 70, and an aperture 92 in sidewall 68 that are configured to cooperate with a positive engagement-type latch assembly. Apertures 88, aperture 90, and aperture 92 are generally aligned with one another to enable a portion of latch assembly 28 to extend through sidewalls 76, 70, and 68 and releasably engage one or more of apertures 54 in lower track 22. Each of apertures 88 are generally horizontally aligned, rectangular openings that correspond to apertures 54*b* in lower track 22. Apertures 90 and 92 each have the shape of a generally elongated slot that extends across a distance that is substantially equivalent to the distance over which the series of four apertures 88 extend.

According to other exemplary embodiments, sidewalls 76, 70, and 68 of the upper track may include no apertures or each may include one or more of a variety of different apertures having one or more of a variety of different shapes, sizes, and spacing configurations. According to other exemplary embodiments, the number, size, shape, and spacing of the apertures in sidewalls 76, 70, and 68 of the upper track may be varied to accommodate one of a variety of different latching assemblies. For example, sidewalls 76, 70, and 68 of the upper track may each include a single, circular aperture to accommodate a latch assembly that includes a single pin that is configured to extend through each of the apertures in the upper track and through a corresponding aperture in the lower track, or the sidewalls may include a set of apertures that are configured to accommodate one or more of a variety of other latch assemblies.

As shown in FIGS. 6 and 7, intermediate wall or top 80 of upper track 24 includes apertures 94, which are configured to receive one of a variety of different coupling members, fasteners, or structures (e.g., pins, studs, rivets, dowels, bolts, etc.) that may be used to couple upper track 24 to a portion of seat 11 (or to a variety of other structures or brackets). One example of such a coupling member is pin or stud 96 (see FIGS. 2, 30, and 31) which extends through aperture 94 and which is configured to couple to the frame or other portion of seat 11. According to other exemplary embodiments, the apertures in the top of the upper track may vary in number, size, shape, and configuration in order to allow the upper track to be coupled to one or more of a variety of different seat configurations or other structures.

Referring still to FIGS. 6 and 7, sidewall 76 of upper track 24 includes apertures 98, which are configured to receive one of a variety of different coupling members, fasteners, or structures (e.g., pins, studs, rivets, dowels, bolts, etc.) that may be used to couple latch assembly 28 (or a portion of latch assembly 28) to upper track 24, or that may be used to couple other components to upper track 24. Sidewall 76 of upper track 24 also includes an aperture 99 that is configured to receive a portion of lever assembly 21. According to other exemplary embodiments, the different apertures in the sidewall of the upper track may vary in number, size, shape, and configuration in order to allow one or more of a variety of different latch assemblies, lever assemblies, or other components or structures to be coupled to the upper track.

Like lower track 22, upper track 24 also includes a plurality of projections (e.g., indentations, recesses, extensions, protrusions, etc.) shown as stops 100 that are located at positions around the cross-section of upper track 24 that correspond to the channels or spaces formed between lower track 22 and upper track 24 that are configured to receive friction reducing members or bearings 26 (discussed below). Each of stops 100 extends into its corresponding bearing channel by a distance that is sufficient to stop a bearing from traveling beyond stop 100 when the bearing comes into contact with stop 100 but not so far that it otherwise interferes with the movement of upper track 24 relative to lower track 22. According to one exemplary embodiment, upper track 24 includes a set of four stops 100 proximate the front of upper track 24 and a set of four stops 100 proximate the rear of upper track 24. Each set of four stops 100 includes: i) one stop 100 extending from upper portion 71 of sidewall 68 of channel 62, ii) one stop 100 extending from intermediate wall 72 of channel 62, iii) one stop 100 extending from intermediate wall 78 of channel 64, and iv) one stop 100 extending from the intersection between intermediate wall 78 and sidewall 74 of channel 64. According to other exemplary embodiments, the upper track may include more or less than two sets of stops, and each set of stops may include more or less than four individual stops in one or more of a variety of different locations around the cross-section of the upper track depending on the number and location of the bearings and the bearing channels or spaces. According to other exemplary embodiments, each stop may be a separate element that is coupled to the upper track, or the stops may be integrally formed (e.g. punched, stamped, deflected, etc.) with the rest of the upper track.

Upper track 24 also includes two projections (e.g., fingers, indentations, recesses, flanges, extensions, protrusions, etc.) shown as stops 102 that generally extend outwardly from sidewall 68 of channel 62 near the rear of upper track 24 and approximately the middle of upper track 24. Stops 102 are configured to contact stops 61 on lower track 22 to limit the extent to which upper track 24 may move relative to lower track 22. The maximum forward and rearward positions of upper track 24 relative to lower track 22 may be adjusted by adjusting the position of stops 102 of upper track 24 and/or stops 61 of lower track 22. According to one exemplary embodiment, stops 102 of upper track 24 are located between stops 61 of lower track 22 when upper track 24 and lower track 22 are coupled together. In this embodiment, upper track 24 may translate forward along lower track 22 until the forward-most stop 102 of upper track 24 contacts the forward-most stop 61 of lower track 22. Similarly, upper track 24 may translate rearward along lower track 22 until the rearward-most stop 102 of upper track 24 contacts the rearward-most stop 61 of lower track 22. According to other exemplary embodiments, each stop may be a separate element that is coupled to the upper track, or the stops may be integrally formed (e.g. punched, stamped, deflected, etc.) with the rest of the upper track.

As best shown in FIG. 3, lower track 22 and upper track 24 are coupled together in a manner that allows upper track 24 to translate relative to lower track 22. In this coupled condition, sidewall 68 of upper track 24 extends upwardly into channel 30 of lower track 22, and sidewall 74 of upper track 24 extends generally upwardly into channel 32 of lower track 22. At the same time, sidewall 38 of lower track 22 extends into channel 62 of upper track 24, and sidewall 44 of lower track 22 extends into channel 64 of upper track 24. In other words, outer channel 30 of lower track 22 interlocks or engages outer channel 62 of upper track 24, and inner channel 32 of lower track 22 interlocks or engages inner channel 64 of upper track 24. Intermediate channel 34 of lower track 22 is generally aligned with intermediate channel 66 of upper track 24 to define an internal volume or chamber 81 between upper track 24 and lower track 22. Friction reducing members 26 (described below) are provided between various portions of upper track 24 and lower track 22 to maintain the alignment of upper track 24 and lower track 22 and to facilitate the translational movement of upper track 24 relative to lower track 22.

In the coupled condition illustrated in FIG. 3, intermediate channel 66 of upper track 24 is bordered on its left by outer channel 30 of lower track 22 and on its right by inner channel 32 of lower track 22. The height of outer channel 30 of lower track 22 (e.g., the distance that intermediate wall 40 lies above base 48) is approximately equal to the height of intermediate channel 66 of upper track 24 (e.g. the distance that top 80 of upper track 24 lies above base 48 of lower track 22). The height of inner channel 32 of lower track 22 (e.g., the distance that intermediate wall 46 lies above base 48), on the other hand, is less than the height of intermediate channel 66 of upper track 24. According to other exemplary embodiments, the height of inner channel 32 of lower track 22 is roughly half of, or a third of, the height of intermediate channel 66 of upper track 24. Accordingly, a portion of sidewall 76 of intermediate channel 66 extends above the top of channel 32 (e.g., extends above intermediate wall 46) by a distance D. The portion of sidewall 76 that extends above the top of channel 32 by a distance D provides an area or surface to which a latch assembly 28 (described below) may be coupled and allows such a latch assembly 28 to extend substantially horizontally from sidewall 76. To facilitate the coupling of latch assembly 28 to the portion of sidewall 76 that extends above the top of channel 32, the height of the aperture or apertures in sidewall 76 of upper track 24 (e.g., aperture 82 or apertures 88), the aperture or apertures in sidewall 70 of upper track 24 (e.g., apertures 84 or aperture 90), the apertures in sidewall 38 of lower track 22 (e.g., apertures 54), and the aperture or apertures in sidewall 68 of upper track 24 (e.g. apertures 86 or aperture 92) are generally greater than the height of the top of channel 32 of lower track 22.

According to other exemplary embodiments, the height of one or more of the latching-related apertures in the upper track and in the lower track may be less than the height of channel 32 and the latch assembly may be configured to engage each of such apertures. For example, the apertures in sidewall 76 may be higher than the apertures in sidewall 70, which in turn may be higher than the apertures in sidewall 38, which in turn may be higher than the apertures in sidewall 68, and the latch assembly may be configured to cooperate with the angled alignment of the apertures to releasably retain the upper track in a position with respect to the lower track.

According to other exemplary embodiments, the size, shape, and configurations of the upper track and the lower track may vary depending on one or more of a plurality of different factors, including the application in which the tracks will be used, the environment in which the tracks will be used, the size of the bearings used between the upper track and the lower track, the particular latch assembly or power adjustment arrangement with which the tracks will be used, cost considerations, manufacturing considerations, etc. For example, according to other exemplary embodiments, the height of the outer channel of the lower track may be higher or lower than the height of the intermediate channel of the upper track, and/or the height of the inner channel of the lower track may be greater than or less than roughly half the height of the intermediate channel of the upper track.

According to one exemplary embodiment, each of upper track 24 and lower track 22 are integrally formed as a single unitary body from a single piece of ultra high strength steel that is preferably roll-formed and may be stamped. According to other exemplary embodiments, the upper track and/or the lower track may be constructed from two or more separate pieces of material that are coupled together, such as through the use of welding, fasteners, or other techniques or methods. According to still other exemplary embodiments, the upper track and lower track may be constructed from one or more of a variety of different materials including various metals, polymers, composites, etc.

Figure 30:
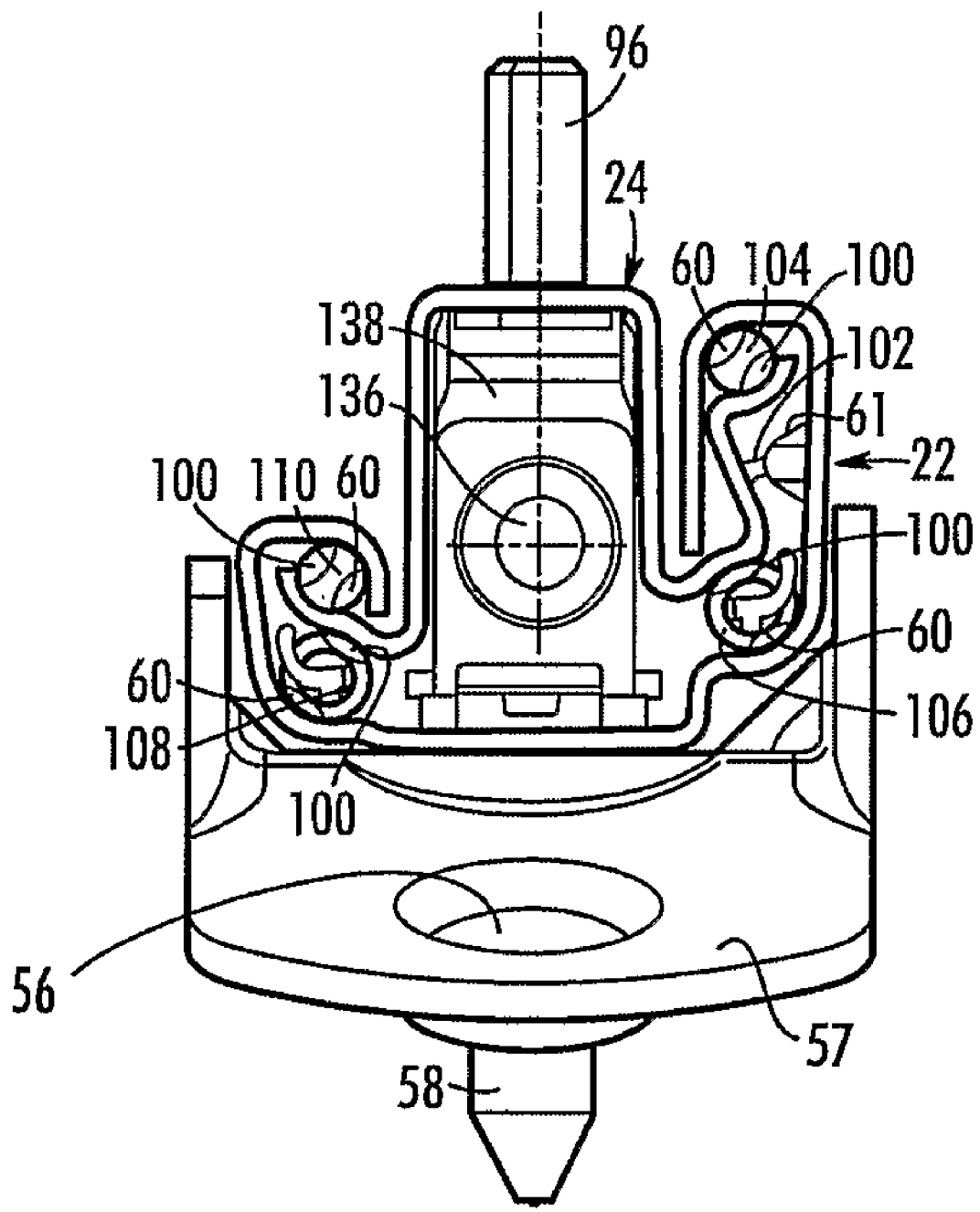
FIG. 30 is an end view of a track arrangement of the track system of FIG. 2.
Figure 31:
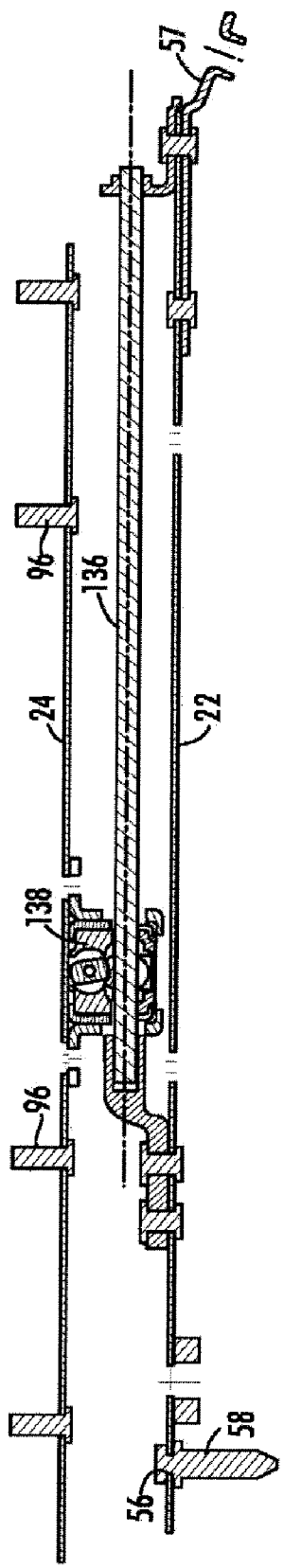
FIG. 31 is a cross-sectional view of a track arrangement of the track system of FIG. 2 taken along line 31-31.

Referring now to FIGS. 3 and 30, friction reducing members 26 (e.g., balls, rollers, bushings, bearings, rolling elements, etc.) shown as ball bearings 104, 106, 108, and 110, are intended to provide and maintain the alignment between lower track 22 and upper track 24 and/or to reduce the friction between lower track 22 and upper track 24 during the movement of upper track 24. According to one exemplary embodiment, bearings 104, 106, 108, and 110 each represent a plurality of similarly located bearings that are disposed along the length of track arrangement 18 generally between lower track 22 and upper track 24. For purposes of this disclosure, the phrases "set of bearings" and "set of friction reducing members" are intended to refer to the plurality of similarly located bearings disposed along the length of a track in a row (e.g., as shown in FIG. 3, reference numeral 104 represents a plurality of bearings in line with the bearing shown). Bearing 104 (and the plurality of other similar bearings bearing 104 represents) is generally positioned between upper portion 71 of sidewall 68 of upper track 24 and the intersection between intermediate wall 40 and sidewall 38 of lower track 22. To accommodate bearing 104, upper portion 71 of sidewall 68 is curved or radiused (e.g., the bearing supporting side of upper portion 71 is generally concave) and the intersection between intermediate wall 40 and sidewall 38 of lower track 22 has a radius that is configured to receive bearing 104. Bearing 106 (and the plurality of other similar bearings bearing 106 represents) is generally positioned between intermediate wall 72 of upper track 24 and the intersection between sidewall 36 and base 48 of lower track 22. To accommodate bearing 106, intermediate wall 72 is curved or radiused (e.g., the bearing supporting side of intermediate wall 72 is generally concave) and the intersection between sidewall 36 and base 48 of lower track 22 has a radius that is configured to receive bearing 106. Bearing 108 (and the plurality of other similar bearings bearing 108 represents) is generally positioned between intermediate wall 78 of upper track 24 and the intersection between base 48 and sidewall 42 of lower track 22. To accommodate bearing 108, intermediate wall 78 is curved (e.g., the bearing supporting side of intermediate wall 78 is generally concave) and the intersection between base 48 and sidewall 42 of lower track 22 has a radius that is configured to receive bearing 108. Bearing 110 (and the plurality of other similar bearings bearing 110 represents) is generally positioned between the intersection of intermediate wall 78 and sidewall 74 of upper track 24 and the intersection between intermediate wall 46 and sidewall 44 of lower track 22, each of which has a radius that is configured to receive bearing 110.

According to other exemplary embodiments, the size of each of the bearings may vary depending on the precise configuration and spacing of the upper and lower tracks. According to other exemplary embodiments, the number and location of the friction members or bearings may vary. For example, the track arrangement may be configured to include bearings at one, two, three, five, or more than five locations around the cross-section of the track arrangement rather than at four locations. According to still other exemplary embodiments, the friction reducing members may be one of a variety of different friction reducing members, including roller bearings, needle bearings, oval-shaped bearings, bushings, etc. According to still other exemplary embodiments, one or more different types of friction reducing members may be used together in the track arrangement. According to still other exemplary embodiments, the bearings may be fixed to, or captured within, one track or may be free to slide or move within the respective channel along the length of the tracks (until they hit the stops). According to still other exemplary embodiments, one or more sets of the bearings may be provided in a body, guide, carriage, or cage (see, e.g., carriage 13 in FIG. 27) that fixes the location of each bearing in the set relative to the other bearings in the set but still allows each bearing to freely roll (see FIG. 27).

Latch assembly 28 (coupler, latching device, lock, fastener, etc.) is a mechanism or assembly that is intended to cooperate with the latching-related apertures in lower track 22 and upper track 24 to releasably retain upper track 24 in a fixed positioned relative to lower track 22. According to other exemplary embodiments, latch assembly 28 is configured to be fixedly coupled in a generally horizontal orientation to the area of sidewall 76 of upper track 24 that extends above the top of inner channel 32 of lower track 22. Coupling latch assembly 28 to the side of upper track 24 helps to minimize the extent to which latch assembly 28 (or any of its components) extends above or below the periphery of lower track 22 and upper track 24, which facilitates the coupling of track arrangement 18 to a seat and to a vehicle. Although latch assembly 28 may be provided in one of a variety of different embodiments, many of those embodiments function in the same general manner. In many embodiments, latch assembly 28 includes at least one finger or projection (e.g., pin, bar, beam, key, etc.) that is configured to extend through an aperture in sidewall 76 of upper track 24 (e.g., one of apertures 88), an aperture in sidewall 70 of upper track 24 (e.g., one of apertures 84 or aperture 90), an aperture in sidewall 38 of lower track 22 (e.g., one of apertures 54), and/or an aperture in sidewall 68 (e.g., one of apertures 86 or aperture 92) of upper track 24. By extending through the aperture in lower track 22, which is stationary, the finger or pin is essentially locked in place with respect to translational movement along the length of lower track 22. Because the pin also extends through apertures in upper track 24, the pin also locks upper track 24 in place. To release upper track 24 and allow it to move or translate relative to lower track 22, the finger or projection is retracted until it no longer extends through aperture 54 in sidewall 38 of lower track 22. In addition to the fingers or projections, latch assembly 28 includes various structures (e.g., a series of springs, levers, cams, hinges, solenoids, braces, plates, assemblies, supports, and/or pivots, etc.) that cooperate together to allow an occupant of the vehicle seat to at least partially control the insertion and retraction of the finger or projection into one or more of the apertures 54 of lower track 22 while seated on the vehicle seat and to adjust the fore and aft position of the seat.

According to one exemplary embodiment illustrated in FIGS. 8-24, latch assembly 28 is a positive engagement latch 150 that includes a support structure 152, a pin 154, an actuating member 156, a resilient member 158, a back plate 160, and a pin assembly 162.

Figure 17A:
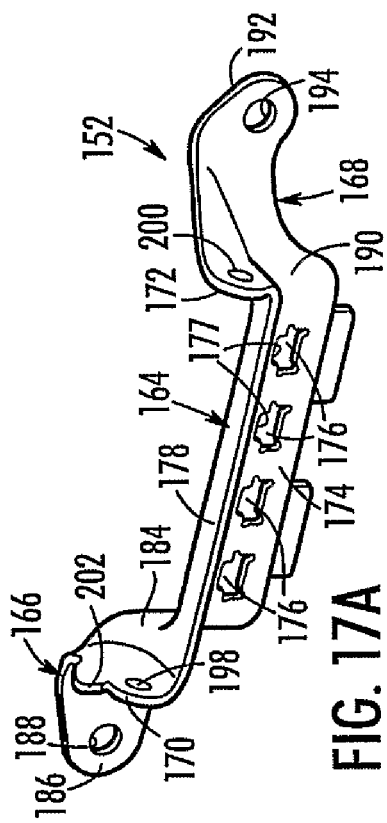
FIGS. 17A and 17B are perspective views of a support structure of the latch assemblies of the track system of FIG. 8.
Figure 17B:
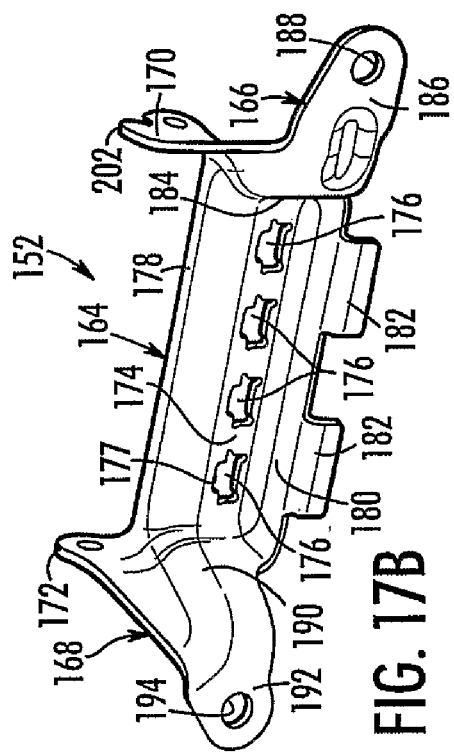

Referring now in particular to FIGS. 8, 9, 11, 12, 13, 14, 17A, 17B, 23 and 24 support structure 152 (e.g., frame, brace, guide, etc.) is an integrally-formed, rigid member that is coupled to sidewall 76 at a location generally above the top of channel 32 of lower track 22. Support structure 152 serves generally as the base of latch 150 and provides a solid structure to which the other components of latch 150 may be coupled, either directly or indirectly. As shown in FIGS. 17A and 17B, support structure 152 includes a central portion 164, two arms 166 and 168, and two ears 170 and 172. Central portion 164 of support structure 152 includes a generally flat or planar portion 174, four pin apertures 176, a flange 178, a flange 180, and two downwardly extending tabs 182. Flat portion or panel 174 is a substantially rectangular-shaped portion of central portion 164 that is generally parallel to, and spaced apart from, sidewall 76 of upper track 24 when support structure 152 is coupled to sidewall 76. The four pin apertures 176 extend through flat portion 174 and are located at spaced apart intervals on the face of flat portion 174 and generally form a line in the center of flat portion 174 that extends along the length of flat portion 174. The arrangement, orientation, and spacing of pin apertures 176 generally corresponds to the arrangement and spacing of the four apertures 88 in sidewall 76 of upper track 24 and apertures 90 and 92 in sidewalls 70 and 68, respectively (see FIG. 7), to enable the four pins (described below) to extend through upper track 24 and engage apertures 54b in lower track 22 (see FIG. 5). Each of pin apertures 176 is generally rectangular shaped and includes a notch 177 in its upper edge that is configured to receive a projection (described below) extending from a portion of pin assembly 162 so that pin assemblies 162 can be inserted through pin apertures 176. To help reduce any stress concentrations that may arise in support structure 152 as a result of pin assemblies 162 contacting the edges of apertures 176, each of the four corners of each aperture 176 is radius or rounded. Flange 178 extends generally perpendicularly away from the top of flat portion 174 in a direction opposite sidewall 76. As will be discussed more below, flange 178 generally extends between the bottom of ears 170 and 172 and helps to reinforce and strengthen ears 170 and 172. Flange 180 extends generally perpendicularly away from the bottom of flat portion 174 toward sidewall 76. Flange 180 generally extends between arm 166 and arm 168 and helps to reinforce and strengthen support structure 152. Two tabs 182 extend downwardly from the distal end of flange 180, and are positioned proximate and parallel to sidewall 76 when support structure 152 is coupled to sidewall 76.

Arms 166 and 168 extend from each end of central portion 164 and generally serve to couple central portion 164 to sidewall 76 in a manner that positions central portion 164 (and pin apertures 176) in the appropriate location relative to sidewall 76 and in a manner that provides sufficient support and rigidity to central portion 164. Arm 166 is generally L-shaped and includes a leg 184 and a leg 186. Leg 184 extends from one end of central portion 164 toward sidewall 76. Leg or flange 186 extends from the distal end of leg 184 in a direction away from the center of latch 150 so that leg 186 is generally parallel with, and adjacent to, sidewall 76 when support structure 152 is coupled to sidewall 76. Leg 186 includes an aperture 188 that corresponds to an aperture in upper track 24, such as an aperture 98 (see FIG. 7), and is configured to receive a fastener shown as bolt 196 that serves to couple support structure 152 to sidewall 76 (and to back plate 160). Leg 184 provides the spacing between central portion 164 and sidewall 76, while leg 186 provides structure to facilitate the coupling of support structure 152 to sidewall 76. Arm 168 is generally identical to arm 166 except that it extends from the opposite end of central portion 164. Arm 168 is generally L-shaped and includes a leg 190 and a leg 192. Leg 190 extends toward sidewall 76 from the opposite end of central portion 164. Leg or flange 192 extends from the distal end of leg 190 in a direction away from the center of latch 150 so that leg 192 is generally parallel with, and adjacent to, sidewall 76 when support structure 152 is coupled to sidewall 76. Leg 192 includes an aperture 194 that corresponds to an aperture in upper track 24, such as an aperture 98 (see FIG. 7), and is configured to receive a fastener shown as bolt 196 that serves to couple support structure 152 to sidewall 76 (and to back plate 160). According to other exemplary embodiments, arms 166 and 168 may be configured to be coupled to upper track 24 using one or more of a variety of different fasteners, including various bolts, screws, studs, nuts, rivets, snaps, clamps, clips, etc., or one or more other coupling methods or techniques, including welding, adhesion, press fit, etc. As with the corresponding legs of arm 166, leg 190 provides the spacing between central portion 164 and sidewall 76, while leg 192 provides structure to facilitate the coupling of support structure 152 to sidewall 76. Flange 180 generally extends between leg 184 of arm 166 and leg 190 of arm 168 and helps to rigidify support structure 152.

Ears 170 and 172 (e.g., tabs, extensions, projections, etc.) are protrusions that extend upwardly generally from leg 184 of arm 166 and leg 190 of arm 168, respectively, and that provide the structure to receive shaft or pin 154. Ears 170 and 172 each include an aperture 198 and 200, respectively, that are configured to receive a portion of shaft 154. Apertures 198 and 200 are aligned with one another so that the longitudinal axis of shaft 154 is generally parallel to flat portion 174 of central portion 164. Ear 170, which is the ear closest to the front of the vehicle, includes a notch or recess in the region of ear 170 that is generally above aperture 198 and forms a substantially vertical face or ledge 202. As will be discussed further below, ledge 202 serves as a positive stop that limits the extent to which actuating member 156 may be rotated around shaft 154. Flange 178 generally extends between ears 170 and 172 and helps to rigidify support structure 152.

According to various other exemplary embodiments, the support structure may take one of a variety of different shapes, sizes, orientations, and configurations. For example, instead of having two ears proximate the ends of the central portion of the support structure, one or more ears may be provided near the center of the central portion. Moreover, the arms of the support structure may be configured differently depending on a variety of factors, including space constraints, the configuration of other components of the latch assembly, etc. According to other exemplary embodiments, the support structure may include one or more of a variety of different flanges, channels, ribs, etc. to provide the support structure with the appropriate strength and rigidity. According to still other exemplary embodiments, the support structure may be integrally-formed as a single unitary body, or may be comprised of two or more separate components coupled together.

Figure 9:
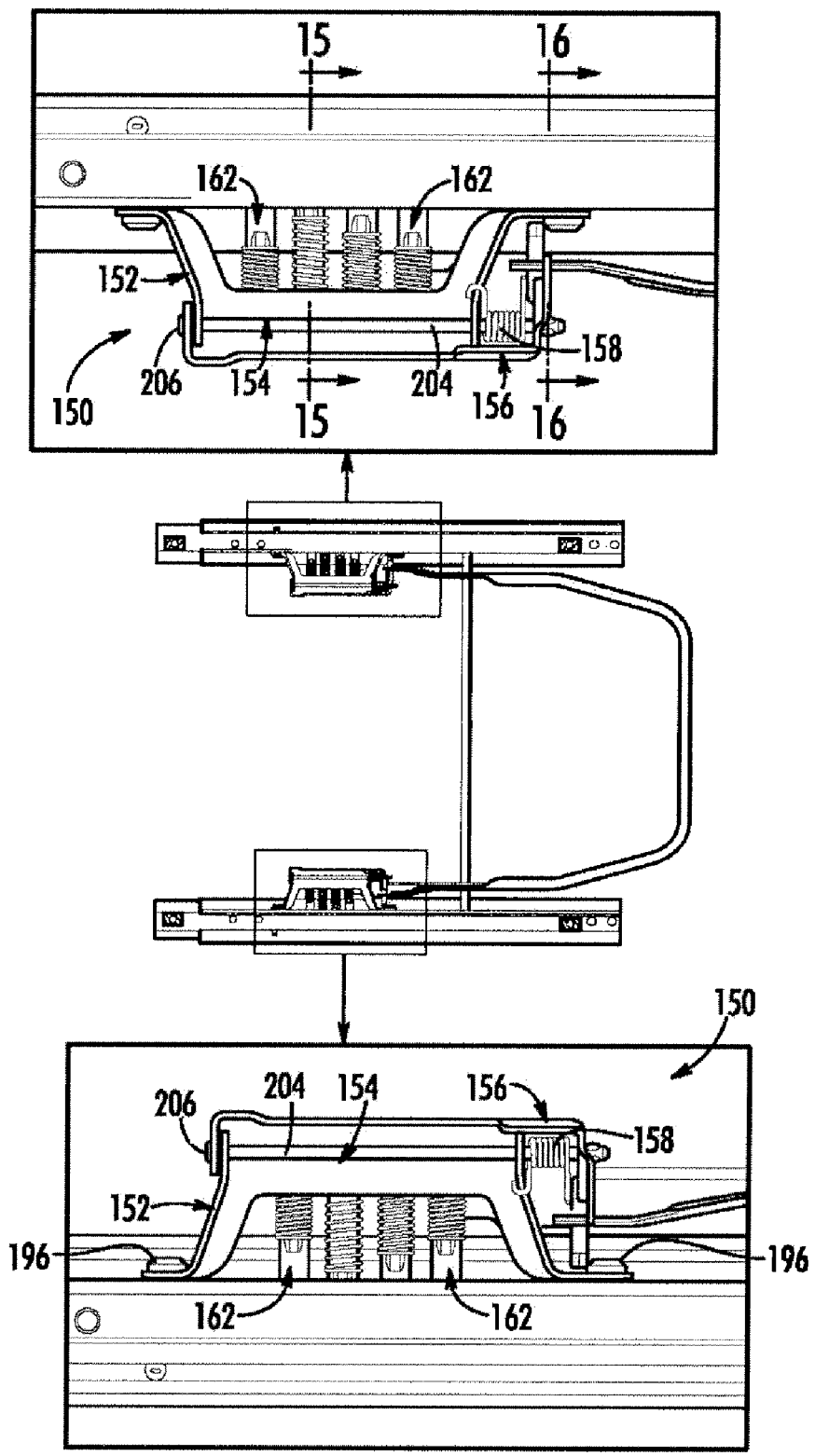
FIG. 9 is a top view of the track system of FIG. 8, with the portions of the track system proximate the latch assemblies shown enlarged.

As best seen in FIGS. 8 and 9, pin 154 (e.g., pivot, shaft, beam, bar, etc.) is an elongated member that serves to couple actuating member 156 to support structure 152 in a manner that allows actuating member 156 to rotate or pivot relative to support structure 152. Pin 154 extends through apertures 198 and 200 in support structure 152 as well as apertures in actuating member 156 (described below), and provides a pivot point or axis around which actuating member 156 rotates or pivots. Pin 154 includes an elongated generally cylindrical shaft 204 and an enlarged head 206 at one end that stops pin 154 from being able to pass completely through apertures 198 and 200 or the apertures in actuating member 156. Once pin 154 has been the inserted through the appropriate apertures in support structure 152 and in actuating member 156, and spring 158 (discussed below) has been positioned around pin 154, the end of shaft 204 opposite head 206 is deformed or enlarged (e.g., crimped, stamped, flared, etc.) to keep pin 154 from sliding out of the apertures in support structure 152 and/or actuating member 156 during the operation of latch 150.

According to other exemplary embodiments, the pin may be a single unit that extends across the support structure, or the pin may be two or more separate pieces, with each piece coupling a portion of the support structure to a portion of the actuating member. For example, one small pin may couple ear 170 of support structure 152 to end 214 of actuating member 156 (described below), and another small pin may couple ear 172 of support structure 152 to end 212 of actuating member 156 (described below). According to other exemplary embodiments, the pin may be integrally-formed with another component of the latch assembly, such as the support structure or the actuating member. According to still other exemplary embodiments, the pin may have a cross-section that is circular, rectangular, triangular, or some other shape, and the cross-section may vary along the length of the pin.

Figure 18A:
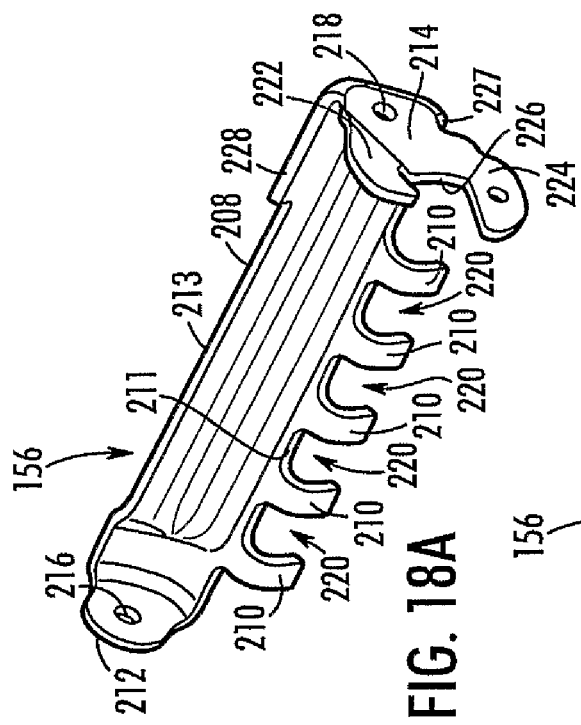
FIGS. 18A and 18B are perspective views of an actuating member of the latch assemblies of the track system of FIG. 8.
Figure 18B:
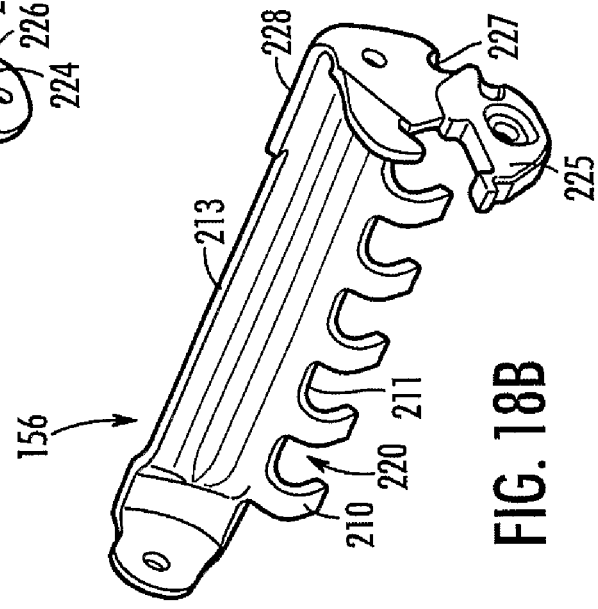

As best seen in FIGS. 18A and 18B, actuating member 156 (e.g., lever, frame, brace, actuator, pin actuator, etc.) is a generally rigid structure that is intended to rotate or pivot around pin 154 relative to support structure 152 upon the application of a force and to act upon or engage pin assemblies 162 as it rotates. According to one exemplary embodiment, actuating member 156 includes a body 208, extensions 210, and ends 212 and 214. Body 208 is an elongated structure having a cross-section that is generally c-shaped (e.g., body 208 resembles approximately one third of a cylinder). A set of five extensions or fingers 210 project radially (or perpendicularly) outward from an edge 211 of body 208. The five fingers 210 are spaced apart along edge 211 of body 208 and generally form four equal gaps or spaces 220 that are configured to receive a portion of each of the four pin assemblies 162. Stated differently, fingers 210 are spaced apart in such a way that one finger 210 is located on each side of a pin assembly 162. Each of fingers 210 is configured to act upon a portion of one or more pin assemblies 162 when actuating member 156 is acted upon by a force and rotated relative to support structure 152. When actuating member 156 is coupled to support structure 152 and the latch has not been actuated to allow upper track 24 to move relative to lower track 22, fingers 210 generally rest against the areas of flat portion 174 that are located between apertures 176.

Ends or caps 212 and 214 are coupled to each end of body 208 and include apertures 216 and 218, respectively. Apertures 216 and 218 are positioned such that they align with apertures 198 and 200 in support structure 152 when actuating member 156 is coupled to support structure 152. When support structure 152 and actuating member 156 are coupled together, shaft 204 of pin 154 extends through apertures 216, 218, 198, and 200 and allows actuating member 156 to pivot or rotate relative to support structure 152. End 214 includes two jaws or barb-like structures 222 and 224 that cooperate to form a generally u-shaped channel 226 that is configured to receive and retain a portion of a lever or release device (e.g., towel bar) (described below) that an occupant of seat 11 can lift or otherwise actuate to release latch 150. A nonmetallic cap or cover 225 that generally covers or encapsulates lower jaw 224 may optionally be provided to help reduce and squeaks, raffles, or other noises that may otherwise result from the direct contact of a portion of lever assembly 21 with lower jaw 224. According to various exemplary embodiments, such a cap may be made from plastic, from DELRIN, an acetal resin commercially available from E.I. du Pont de Nemours and Company, or from one or more of a variety of other nonmetallic or composite materials. End 214 also includes a notch 227 that is located generally below, and slightly closer to upper track 24 than, aperture 218. Notch 227 is generally configured to receive a portion of lever assembly 21 (described below). Body 208 also includes a projection 228 proximate end 214 that extends from a portion of an edge 213 (opposite edge 211) of body 208 in a manner that generally continues along the circumference of the partial cylinder formed by body 208. Projection 228 is intended to contact face 202 of support structure 152 and thereby limit the extent to which actuating member 156 may rotate or pivot in one direction around support structure 152. The extent to which actuating member 156 may pivot or rotate in the opposite direction is limited by the contact made between fingers 210 and flat portion 174 of support structure 152. According to various exemplary embodiments, the actuating member and the support structure may be configured such that the actuating member can rotate up approximately 30 degrees, up to approximately 47 degrees, or up to a point between 30 degrees and 47 degrees. According to other exemplary embodiments, the configuration of actuating member 156 and support structure 152, and the extent to which actuating member 156 may rotate, may vary depending on one or more of a variety of different factors, including the characteristics of the different components of the latch assembly and the tracks.

According to various exemplary embodiments, the actuating member may take one of a variety of different shapes, sizes, orientations, and configurations. For example, instead of having structures to engage the pin near the ends of the body, such a structure or structures may be located generally near the center of the body. Moreover, the end of the actuating member that is configured to receive a portion of the lever assembly may be configured differently depending on a variety of factors, including the configuration of the lever assembly, space constraints, manufacturing considerations, the configuration of other components of the latch assembly, etc. According to other exemplary embodiments, the support structure may include one or more of a variety of different flanges, channels, ribs, etc. to provide the actuating member with the appropriate strength and rigidity. According to still other exemplary embodiments, the actuating member may be integrally-formed as a single unitary body, or may be comprised of two or more separate components coupled together. According to still other exemplary embodiments, the spacing, orientation, and configuration of the fingers of the actuating member may be altered to cooperate with other configurations or embodiments of the other components of the lever assembly.

Figure 13:
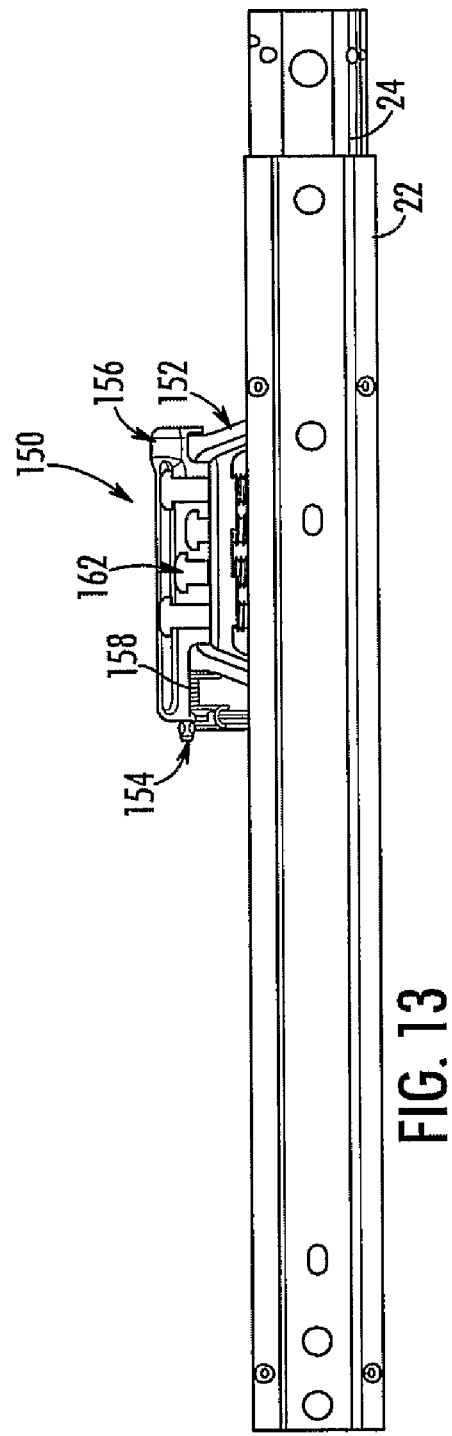
FIG. 13 is a bottom view of a portion of a track arrangement of the track system of FIG. 8.
Figure 15:
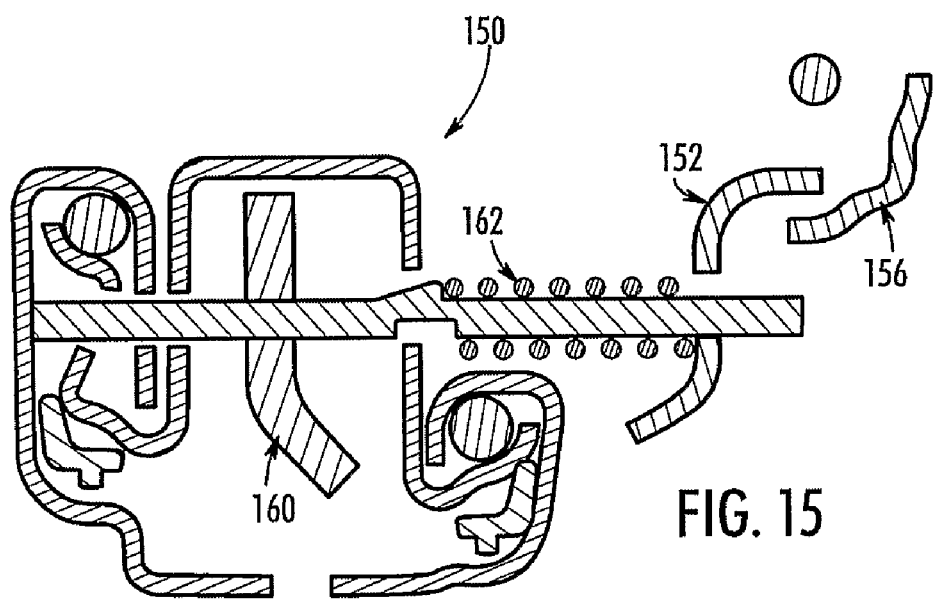
FIG. 15 is a cross-sectional view of a track arrangement of the track system of FIG. 8 taken along lines 15-15 in FIG. 9.
Figure 16:
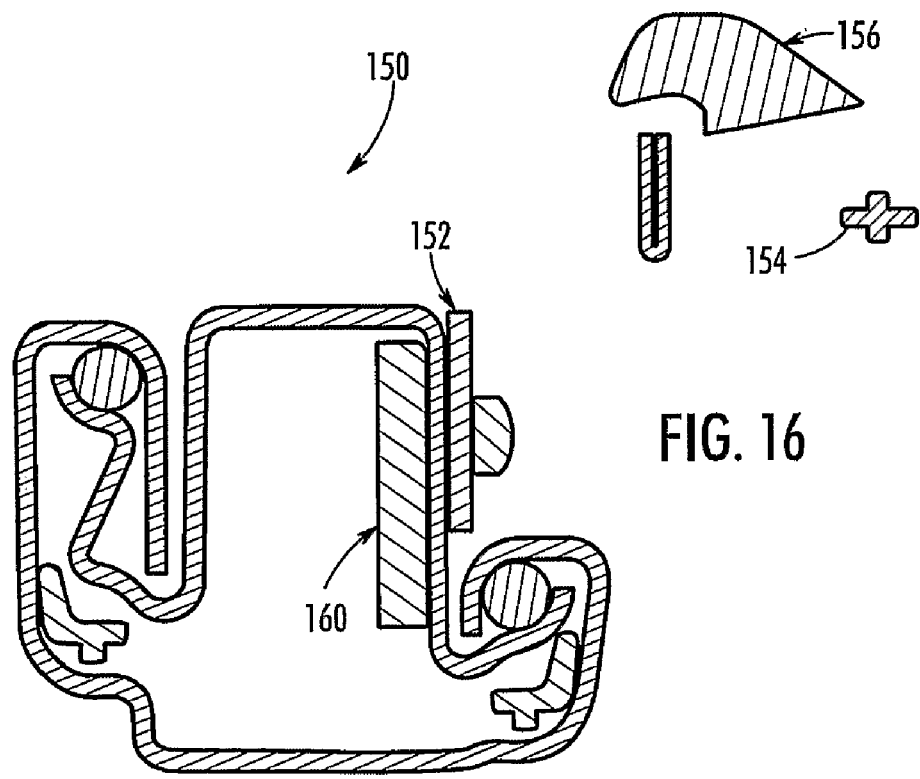
FIG. 16 is a cross-sectional view of a track arrangement of the track system of FIG. 8 taken along lines 16-16 in FIG. 9.

As best seen in FIGS. 8, 9, and 13, resilient member 158 (e.g., spring, torsion spring, coil spring, elastic member, etc.) is a resilient structure that biases actuating member 156 toward the position in which fingers 210 of actuating member 156 generally rest or press against flat portion 174 of support structure 152 (i.e., toward the engaged position). According to one exemplary embodiment, resilient member 158 is a helical torsion spring that is located on shaft 204 of pin 154 between ear 170 of support structure 152 and end 214 of actuating member 156. The two ends of the spring are coupled to support structure 152 and actuating member 156 in such a way that biases actuating member 156 toward the engaged position.

According to various exemplary embodiments, the resilient member may be one of a variety of different springs or other elastic or resilient devices, and may be incorporated into the latch assembly in one of a variety of different ways. For example, the resilient member may be a compression spring that acts upon the actuating member at a location spaced apart from its pivot axis. Moreover, the resilient member may be placed within the latch assembly so that it acts upon the actuating member and any one or more of the other components of the latch assembly or track arrangement.

As best seen in FIGS. 19A-19C, back plate 160 (e.g., frame, guide, brace, etc.) is a generally rigid member that couples to the interior side of sidewall 76 (e.g., the side opposite the side to which support structure 152 is coupled) and that is intended to support and guide pin assemblies 162. Back plate 160 includes a flat portion 230 and arms 232 and 234.

Flat portion 230 of back plate 160 is a substantially rectangular-shaped portion of back plate 160 that is generally parallel to, and spaced apart from, sidewall 76 of upper track 24 when the back plate 160 is coupled to sidewall 76. When the back plate 160 is coupled to sidewall 76, flat portion 230 is also generally parallel to and near sidewall 70 of upper track 24. Flat portion 230 includes four generally rectangular pin apertures 236 that extend through flat portion 230 and that are located at spaced apart intervals on the face of flat portion 230 and generally form a line in the center of flat portion 230 that extends along the length of flat portion 230. The arrangement, orientation, spacing, and location of pin apertures 236 corresponds to the arrangement, orientation, spacing, and location of the four pin apertures 176 of support structure 152, and substantially corresponds to the arrangement, orientation, spacing, and location of the four apertures 88 in sidewall 76 of upper track 24 (see FIG. 7), to enable the four pins (described below) to extend through upper track 24 and engage apertures 54b in lower track 22 (see FIG. 5). To help reduce any stress concentrations that may arise in back plate 160 as a result of the pins contacting the edges of apertures 236, each of the four corners of each aperture 236 is radius or rounded.

Arms 232 and 234 extend from each end of flat portion 230 and generally serve to couple flat portion 230 to sidewall 76 in a manner that positions flat portion 230 (and pin apertures 236) in the appropriate location relative to sidewall 76 and in a manner that provides sufficient support and rigidity to flat portion 230. Arm 232 is generally V-shaped and includes a leg 238 and a leg 240. Leg 238 extends from one end of flat portion 230 generally toward sidewall 76 and away from the center of back plate 160. Leg or flange 240 extends from the distal end of leg 238 in a direction away from the center of latch 150 so that leg 240 is generally parallel and adjacent to sidewall 76. Leg 240 includes an aperture 242 that corresponds to an aperture in upper track 24, such as an aperture 98 (see FIG. 7), as well as aperture 188 in support structure 152, and that is configured to receive a fastener shown as bolt 196 that serves to couple both back plate 160 and support structure 152 to sidewall 76. Essentially, leg 238 provides the spacing between flat portion 230 and sidewall 76, while leg 240 provides structure to facilitate the coupling of back plate 160 to sidewall 76. Arm 234 is generally identical to arm 232 except that it extends from the opposite side of flat portion 230. Arm 234 is generally V-shaped and includes a leg 244 and a leg 246. Leg 244 extends from the opposite end of flat portion 230 toward sidewall 76 and away from the center of back plate 160. Leg or flange 246 extends from the distal end of leg 244 in a direction away from the center of latch 150 so that leg 246 is generally parallel and adjacent to sidewall 76. Leg 246 includes an aperture 248 that corresponds to an aperture in upper track 24, such as an aperture 98 (see FIG. 7) as well as aperture 194 in support structure 152, and that is configured to receive a fastener shown as bolt 196 that serves to couple both back plate 160 and support structure 152 to sidewall 76. According to various exemplary embodiments, arms 232 and 234 may be configured to be coupled to upper track 24 and/or support structure 152 using one or more of a variety of different fasteners, including various bolts, screws, studs, nuts, rivets, snaps, clamps, clips, etc., or one or more other coupling methods or techniques, including welding, adhesion, press fit, etc. As with the corresponding legs of arm 232, leg 244 provides the spacing between flat portion 230 and sidewall 76, while leg 246 provides structure to facilitate the coupling of back plate 160 to sidewall 76.

According to one exemplary embodiment, support structure 152, actuating member 156, and back plate 160 are each made from 340 XF steel. According to other exemplary embodiments, one or more of the support structure, the actuating member, and the back plate may be one or more of a variety of different materials, including various metals, steels, polymers, composites, or other materials or combination of materials that provide the support structure, the actuating member, and the back plate with a sufficient degree of strength and rigidity.

According to other exemplary embodiments, the back plate may take one of a variety of different shapes, sizes, orientations, and configurations. For example, the arms of the back plate may be configured differently depending on a variety of factors, including space constraints, the configuration of other components of the latch assembly, etc. According to other exemplary embodiments, the back plate may include one or more of a variety of different flanges, channels, ribs, etc. to provide the back plate with the appropriate strength and rigidity. According to still other exemplary embodiments, the back plate may be integrally-formed as a single unitary body, or may be comprised of two or more separate components coupled together. According to still other exemplary embodiments, the location of the flat portion of the back plate between sidewall 76 and sidewall 70 of upper track 24 may be varied. For example, the flat portion may be closer to sidewall 76 than it is to sidewall 70, the flat portion may be closer to sidewall 70 than it is to sidewall 76, or the flat portion may be equally close to sidewalls 76 and 70.

As best seen in FIG. 20A-22B, pin assembly 162 is an assembly of components that provide a biased apparatus for moving into and out of an aperture 54b in lower track 22 and for extending through apertures in support structure 152, upper track 24, and back plate 160. According to one exemplary embodiment, pin assembly 162 includes a pin 250 and a biasing member 252.

Referring now to FIGS. 21A-21C, pin 250 (e.g., bar, shaft, beam, peg, dowel, post, finger, etc.) is an elongated, rigid member having an upper face or surface 260, a lower face or surface 262, a side 264, and a side 266 Pin 250 is configured to extend through or engage, and to move within, an aperture 176 in support structure 152, an aperture 88 in upper track 24, an aperture 176 in back plate 160, aperture 90 in upper track 24, an aperture 54b in lower track 22, and aperture 92 in upper track 24. According to one exemplary embodiment, pin 250 includes a body portion 254, a head portion 256, and an end portion 258.

Body portion 254 is a generally elongated, rectangular bar having a length L, a width W, and a thickness T. Over most of the length of body portion 254, each of the four corners or edges of body portion 254 extending along the length of body portion 254 are tapered or radiused so that the corners or edges of body portion 254 do not come to a sharp point. Only a small portion of body portion 254 proximate head portion 256 includes corners or edges that are not tapered or radiused. The tapered or radiused corners or edges are intended to reduce any stress concentrations that the sharp corners would otherwise introduce to support structure 152, upper track 24, back plate 160, and/or lower track 22. Body portion 254 includes a projection 268 that extends from the surface of body portion 254 that forms a portion of upper surface 260 of pin 250, and optionally includes a corresponding recess 270 that extends into the surface of body portion 254 that forms a portion of lower surface 262 of pin 250. Projection 268 is a generally ramp-shaped extension that includes an inclined surface 272 that increases in height above upper surface 260 as it extends toward head portion 256 of pin 250, and an upstanding surface 274 that extends generally perpendicularly outward from upper surface 260. According to one exemplary embodiment, inclined surface 272 extends from upper surface 260 at an angle of between approximately 1 and 45 degrees, or more particularly at an angle of approximately 15 degrees. Recess 270 is located on the opposite side of pin 250 as projection 268, and is intended to facilitate the forming of projection 268. As described more fully below, projection 268 is intended to allow biasing member 252 to be easily inserted onto pin 250 (e.g., by sliding it over the inclined side of projection 268), but not be easily removed from pin 250 (e.g., upstanding surface 274 of pin 250 stops the biasing member from sliding off the same way it was slid on).

Head portion 256 of pin 250 forms one end of pin 250 and generally has a width greater than the width of body portion 254. The increased width of head portion 256 forms a ledge or flange 276 on each side of body portion 254 that provides an area against which fingers 210 of actuating member 156 can push to urge pin 250 out of engagement with aperture 54b of lower track 22.

End portion 258 of pin 250 forms the other end of pin 250 and is generally tapered such that the width of end portion 258 reduces as end portion 258 extends away from body portion 254. As end portion 258 extends from body portion 254, it initially reduces width (or tapers) relatively quickly at an area 278, and then tapers more gradually over the remaining portion of end portion 258, or an area 280. According to other exemplary embodiments, the angle of each of the two tapers at areas 278 relative to the longitudinal axis of pin 250 may range from between approximately 20 degrees to approximately 40 degrees. According to one exemplary embodiment, the angle of each of the two tapers at areas 278 relative to the longitudinal axis of pin 250 is approximately 30 degrees. According to other exemplary embodiments, the angle of each of the two tapers at areas 280 relative to the longitudinal axis of pin 250 may range from between approximately 6.5 degrees to approximately 7.5 degrees. According to one exemplary embodiment, the angle of each of the two tapers at areas 280 relative to the longitudinal axis of pin 250 is approximately 7 degrees. According to other exemplary embodiments, the angle of each of the two tapers at areas 280 relative to the longitudinal axis of pin 250 may be less than approximately 6.5 degrees or greater than approximately 7.5 degrees. Like the edges of body portion 254, the edges of end portion 258 are tapered or radiused so that they do not form a sharp corner, which is intended to reduce or eliminate the stress concentrations that such sharp corners would otherwise introduce into structures they contact (such as the areas of lower track 22 around apertures 54b).

According to other exemplary embodiments, the pins may take one of a variety of different shapes, sizes, and configurations. For example, the four corners or edges extending along the length of the body portion may come to a sharp point, may be radiused, may be partially tapered and partially radiused, or may have some other configuration. According to other exemplary embodiments, the cross-section of the pins may be cylindrical, rectangular, triangular, octagonal, or one or more of a variety of different shapes, and the cross-section may be constant or variable over the length of the pin. According to still other exemplary embodiments, the pin may not include projection 268 or any other apparatus, device, or structure to retain the biasing member on the pin. According to other exemplary embodiments, the pin may include some other apparatus, device, or structure other than projection 268 that is configured to retain biasing member on the pin. For example, the pin may include an aperture extending therethrough that is configured to receive one end of the biasing member, or the pin may include a slot, channel, groove, or an indentation that is configured to receive and retain the biasing member.

According to one exemplary embodiment, each of pins 250 is made from 4130 steel and has a hardness ranging from approximately 32-42 Rockwell C, or more particularly, from 36-42 Rockwell C. According to various exemplary embodiments, the hardness of the pins may vary depending on one or more of a variety of different factors, including the material of the pins, the material of the upper and lower tracks, the material of the support structure, the material of the back plate, etc. According to various exemplary embodiments, each of the pins may be made from one or more of a variety of different materials, including various steels, metals, alloys, composites, polymers, etc. According to other various exemplary embodiments, each of the pins may have a hardness less than 36 Rockwell C or more than 42 Rockwell C. According to still other exemplary embodiments, one or more of the pins may be made from a different material and/or have a different hardness than one or more of the other pins.

Referring now to FIGS. 20A-20B and 22A-22B, biasing member 252 (e.g., spring, coil spring, resilient element, elastic member, etc.) is a resilient structure that biases pin 250 toward the position in which it engages an aperture 54b in lower track 22. According to one exemplary embodiment, biasing member 252 is a spring similar to a helical compression spring, except that instead of the winding of coils forming a circular tube as in the case of a helical spring, the winding of coils of spring 252 form a generally oval tube that generally corresponds to the shape of pin 250. The oval shape of spring 252 follows the profile of pin 250 more closely than a circular spring, for example, and thereby creates a generally smaller overall profile or package that makes pin assemblies 162 relatively compact. The relative compactness of pin assemblies 162 facilitates making other components of latch assembly 150 more compact, which in turn helps to minimize any intrusion latch assembly 150 makes into the interior space of the vehicle, which could be used more efficiently or effectively by other components of seat assembly 10 or the vehicle. Biasing member or spring 252 is coupled to pin 250 by sliding spring 252 over end portion 258 and then over projection 268 of body portion 254. The inclined surface 272 of projection 268 allows spring 252 to pushed over projection 268 when spring 252 is moved in the direction of head portion 256. Once spring 252 has been pushed over projection 268 and is generally located around body portion 254 of pin 250 between head portion 256 and projection 268, the perpendicular surface 274 of projection 268 generally makes removal of spring 252 difficult, particularly during the normal operation of pin assembly 162.

According to various exemplary embodiments, the biasing member may be one of a variety of different springs or other elastic or resilient devices, and may take one of a variety of different shapes, sizes, and configurations.

Figure 10:
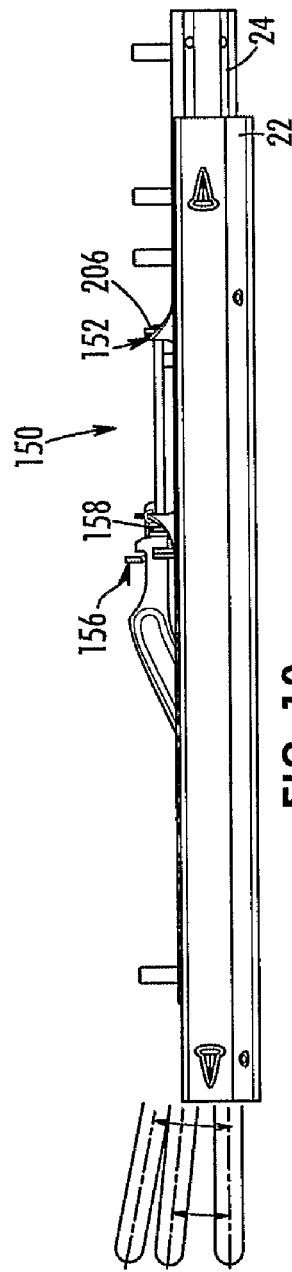
FIG. 10 is a side elevation view of the track system of FIG. 8.
Figure 11:
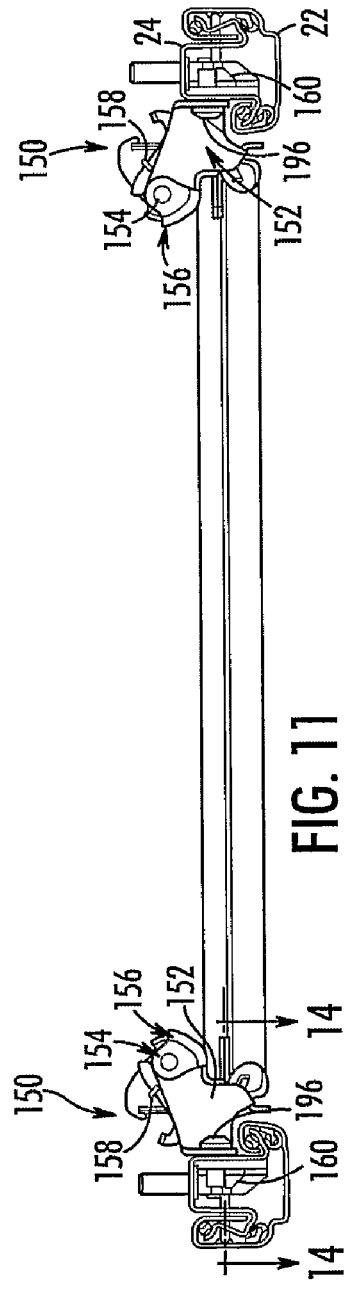
FIG. 11 is an end view of the track system of FIG. 8.

Referring now to FIGS. 8-10, lever assembly 21 is a structure that is operatively coupled to the latch assembly 28 of inboard track arrangement 18 and of outboard track arrangement 20 and facilitates the ability of the occupant of seat 11 to actuate (e.g., release) latch assemblies 28 to adjust the fore and aft position of seat 11. According to one exemplary embodiment, lever assembly 21 includes a lever 282, a pivot rod 284, and a resilient member 286.

Lever 282 (e.g., actuator, release member, "towel bar," etc.) is a generally u-shaped, rigid member having a base 288 and two legs 290 and 292, with each of legs 290 and 292 having an end 294 and 296, respectively. Lever 282 is coupled within track system 16 in such a way that each of the two ends 294 and 296 engage the latch assemblies 28 of inboard track arrangement 18 and outboard track arrangement 20 and legs 290 and 292 extend forward a distance sufficient to generally position base 288 proximate the front of seat 11. Positioning base 288 proximate the front of seat 11 allows an occupant of seat 11 to easily reach down, grab base 288, and actuate lever 282. Ends 294 and 296 are generally configured to engage a portion of latch assemblies 28 that will cause the latch assemblies to move to a disengaged position when lever 282 is actuated. According to one exemplary embodiment, a portion of each of ends 294 and 296 is configured to extend through and be received within channel 226 formed by upper jaw 222 and lower jaw 224 of actuating member 156 of latch assembly 150. Each of ends 294 and 296 includes a projection or barb that is configured to be positioned proximate the back side of one of upper jaw 222 and lower jaw 224 to help retain ends 294 and 296 in the appropriate position. Each of legs 290 and 292 includes an aperture or hole 298 and 300, respectively, that are aligned and configured to receive pivot rod 284 and that serve as the pivot point of lever 282.

According to various exemplary embodiments, the lever may take one of variety of different shapes, sizes, and configurations. For example, the lever may be generally L-shaped, and have only one leg that extends rearward toward one of the latch assemblies. Moreover, the latch assemblies on each side of the seat could be coupled together in such a way that one leg of the lever could actuate both latch assemblies at the same time. The lever could also include two, separate L-shaped components that each engage one of the latch assemblies. According to other various exemplary embodiments, the lever may be configured so that the portion acted upon by the occupant of the seat is located near the side of the seat, near the rear of the seat, or near some other portion of the seat or vehicle, rather than in the front of the seat. According to still other various exemplary embodiments, the lever may be completely located below the seat, a portion of the lever may wrap around the seat (e.g., may extend upward along the front of the seat), or a portion of the lever may extend to other locations relative to the seat to facilitate the occupant's ability to reach the lever and/or to actuate the latch assembly. According to still other exemplary embodiments, the lever may be constructed from one or more of a generally hollow tube, a solid rod, a bent beam, etc., and its cross-section may be one of a variety of different shapes (including circular, rectangular, semicircular, triangular, etc.) and may vary over the length of the lever. For example, the portion of the lever that will be grabbed by an occupant of the seat may have a different shape than the portion of the lever configured to engage one of the latch assemblies. According to still other exemplary embodiments, a portion of the lever may be textured to facilitate the grip of an occupant on the lever, or another material may be coupled to the lever to facilitate an occupant's grip (e.g., a foam cover or grip, or a non-slip material).

Pivot rod 284 (e.g. shaft, tube, beam, etc.), is an elongated, rigid structure that couples lever 282 to upper track 24 of inboard track arrangement 18 and upper track 24 of outboard track arrangement 20 in such a way that allows lever 282 to pivot around rod 284. According to one exemplary embodiment, rod 284 extends from upper track 24 of track arrangement 18, through aperture 298 of lever 282, through aperture 300 of lever 282, to upper track 24 of track arrangement 20. Each end of rod 284 is received within aperture 99 (see FIGS. 6 and 7) of upper track 24 of track arrangements 18 and 20. Each end of rod 284 is crimped, flanged, or otherwise expanded at a portion of rod 284 that is on the inside of, and immediately adjacent to, sidewall 76 of upper track 24. This is intended to restrict the ability of rod 284 to move toward or away from either track arrangement 18 or track arrangement 20 by stopping either end of rod 284 from being pushed further into aperture 99.

According to various exemplary embodiments, the pivot rod may consist of two separate pieces, one that couples one side of the lever to one of the track arrangements and another that couples the other side of the lever to the other track arrangement. For example, the separate pieces may be bolts or studs (or another type of fastener) that extend through the aperture in the lever and thread into an aperture in, or otherwise couple to, the upper track. According to other various exemplary embodiments, the pivot rod may take one of a variety of different shapes, sizes, and configurations.

Member 286 (e.g., rod, spring, spring bar, spring rod, biasing member, etc.) is a resilient, elongated structure that serves as a spring to bias lever 282 toward a position in which ends 294 and 296 are pressed against lower jaw 224 (or cap 225) of actuating member 156. Resilient member 286 is coupled to actuating member 156 on one end, extends over the top of pivot rod 284, and is coupled on the other end to lever 282 at a location that is on the opposite side of pivot rod 284 than actuating member 156. The end of member 286 that is coupled to actuating member 156 is generally retained within notch 227 of actuating member 156. The end of member 286 that is coupled to lever 282 includes a flange or finger that extends into an aperture in lever 282. When lever 282 is in the static position or normal position (the position assumed by lever 282 when latch assembly 28 is in the engaged position), at least one of the points at which resilient member 286 is coupled to actuating member 156 and lever 282 is generally below the top of pivot rod 284, which causes resilient rod 286 to bend or flex. Due to the resilient nature of rod 284, rod 286 applies a force to lever 282 and actuating member 156 that tends to urge ends 294 and 296 of lever 282 against lower jaw 224 (or cap 225) of actuating member 156. When lever 282 is actuated, the end of member 286 that is coupled to lever 282 raises up, while the other end (due to where it is coupled to actuating member 156) retains the same general height. Accordingly, as lever 282 is actuated, the bend or flex in member 286 is reduced and the force applied by member 286 to lever 282 and actuating member 156 is reduced to the point where it does not significantly interfere with the operation of the latch assembly. Essentially, resilient member 286 is intended to reduce any rattle, noise, or vibration that would otherwise occur in the absence of resilient member 286 by forcing or pressing ends 294 and 296 of lever 282 against lower jaw 224 (or cap 225) of actuating member 156 when lever 282 is in the normal position (the position lever 282 would normally be in during the operation of the vehicle).

According to various exemplary embodiments, a resilient member 286 may be provided for each latch assembly, or may be provided for only one of the latch assemblies. According to other various exemplary embodiments, the resilient member may take one of a variety of different shapes, sizes, and configurations. For example, the resilient member may be a torsion or compression spring that is configured to hold or retain the lever against the actuating member or members when the lever is in the normal position. The resilient member could also be a specially configured spring or rod that is coupled to the actuating member on one end and to the end of the lever (e.g., a portion of the lever on the same side of the pivot rod as the actuating member) on the other end. According to still other exemplary embodiments, the spring or resilient member may be coupled to the end of the lever and to a portion of the upper track or to a portion of the latch assembly other than the actuating member. According to still other various exemplary embodiments, the lever assembly may not include the resilient member.

Figure 23:
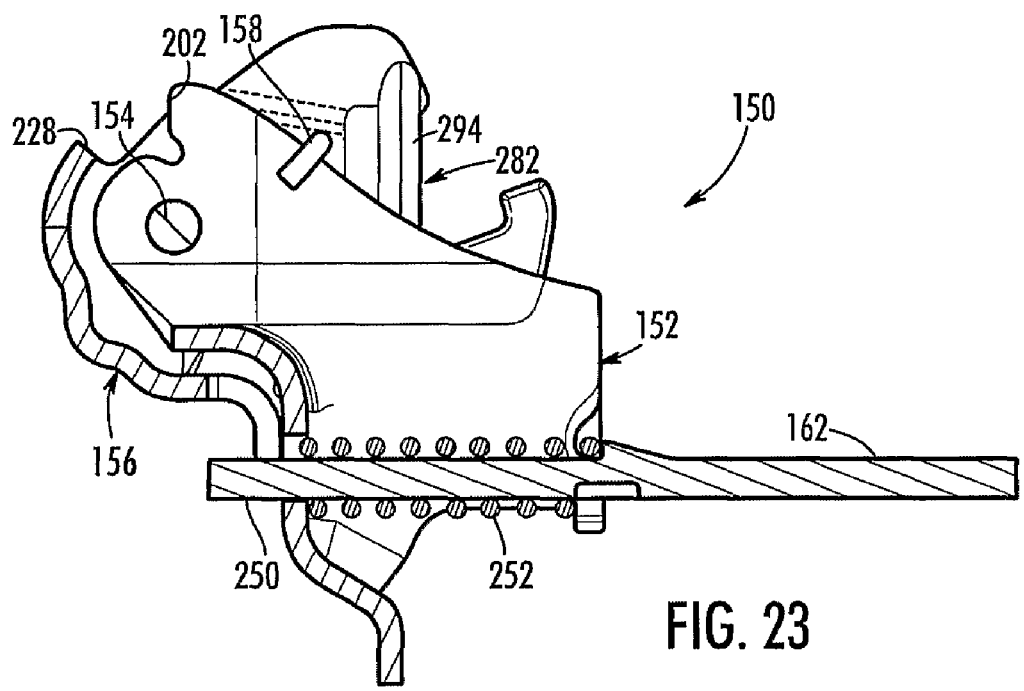
FIG. 23 is a cross-sectional view of a latch assembly according to one exemplary embodiment in which the latch assembly is shown in an engaged position.
Figure 24:
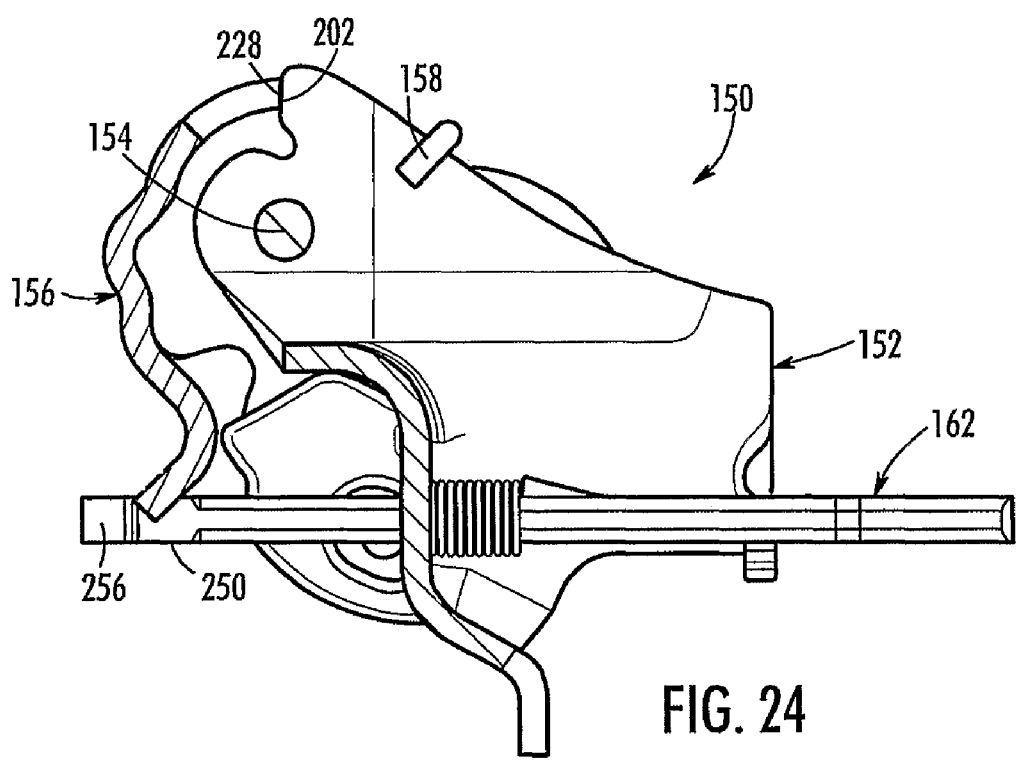
FIG. 24 is a cross-sectional view of the latch assembly of FIG. 23 in which latch assembly is shown in a disengaged position.

Positive engagement latch 150 is configured to move between an engaged position illustrated in FIG. 23, in which the position of upper track 24 relative to lower track 22 is locked, and a disengaged position illustrated in FIG. 24, in which upper track 24 is moveable or slideable relative to lower track 22. Latch 150 is biased toward the engaged position, and remains in the engaged position until an occupant of seat 11 actuates (e.g., directly or indirectly causes the movement of or raises) lever 282 of lever assembly 21, which is generally located below the front of seat 11. Actuating lever assembly 21 causes latch 150 to move to the disengaged position, which then allows the occupant of seat 11 to move seat 11, in a forward or rearward direction, to a desired position. Once the occupant moves seat 11 to the desired location, the occupant releases lever assembly 21, which in turn allows latch 150 to return to the engaged position (as a result of the bias of latch 150 toward the engaged position) and once again lock the position of upper track 24 relative to lower track 22.

To actuate lever assembly 21, the occupant generally reaches down below the front of seat 11, grabs base 288 of lever 282, and pulls it upward. When the occupant pulls base 288 upward, lever 282 pivots or rotates around pivot rod 284, which in turn causes ends 294 and 296, which are located on the other side of pivot rod 284, to move downward. Each of ends 294 and 296 are coupled to substantially identical latch assemblies 150, with each latch assembly 150 being a mirror image of the other. Accordingly, only the operation of the latch assembly 150 that cooperates with end 294 of lever 282 will be described, it being understood that the operation of the latch assembly 150 that cooperates with end 296 is identical. Because end 294 is coupled to actuating member 156, the downward movement of end 294 causes actuating member 156 to rotate around pin 154. As actuating member 156 rotates around pin 154, fingers 210 of actuating member 156 move away from support structure 152. The spacing between fingers 210 is slightly greater than the width W of body portion 254 of pin 250, but less than the width of head portion 256 of pin 250. Accordingly, as fingers 210 move away from support structure 152, fingers 210 eventually engage or contact flanges 276 of head portion 256 of each pin 250 (which as described below may have varying degrees of engagement with lower track 22). This contact between fingers 210 and each of pins 250 causes each of pins 250 to be pulled away from upper and lower tracks 22 and 24 along with fingers 210. Lever assembly 21 and actuating member 156 are configured so that the movement of end 294 of lever 282 causes actuating member 156 to rotate around pin 154 by an amount that is sufficient to allow fingers 210 to pull pins 250 away from upper and lower tracks 22 and 24 by a distance that is sufficient to remove pins 250 from apertures 54b in lower track 22. As each of pins 250 is pulled away from upper and lower tracks 22 and 24; each corresponding spring 252 becomes compressed between perpendicular surface 274 of pin 250 and flat portion 174 of support structure 152.

Once pins 250 have been removed from, or slid out of, apertures 54b in lower track 22, the occupant of seat 11 is able to move seat 11 forward or rearward within the range of motion permitted by upper and lower tracks 22 and 24. When the occupant has reached the desired position, he or she releases lever 282 to lock seat 11 in the new position. For at least obvious reasons, latch assembly 150 is biased toward the engaged position (e.g. the position in which pins 250 engage apertures 54b in lower track 22) and must be acted upon by the force provided by an occupant or other outside source in order to be moved to a disengaged position (e.g., the position in which pins 250 do not engage apertures 54b in lower tracks 22). Once the occupant releases lever 282, the bias of latch assembly 150 causes latch assembly 150 to return to the engaged position. More specifically, springs 252 urge pins 250 toward upper and lower tracks 22 and 24, and spring 158 urges actuating member 156 to rotate such that fingers 210 move back toward support structure 152.

Figure 14:
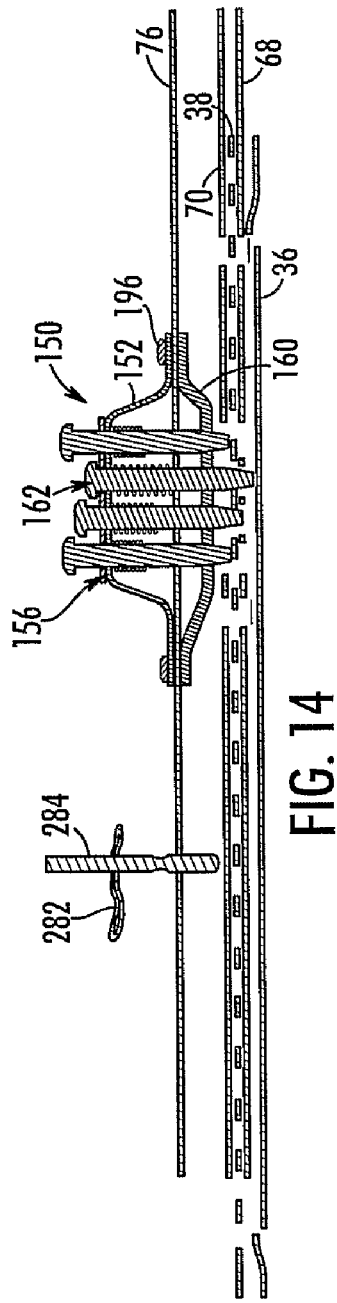
FIG. 14 is a cross-sectional view of a track arrangement of the track system of FIG. 8, taken along lines 14-14 in FIG. 11.
Figure 12:
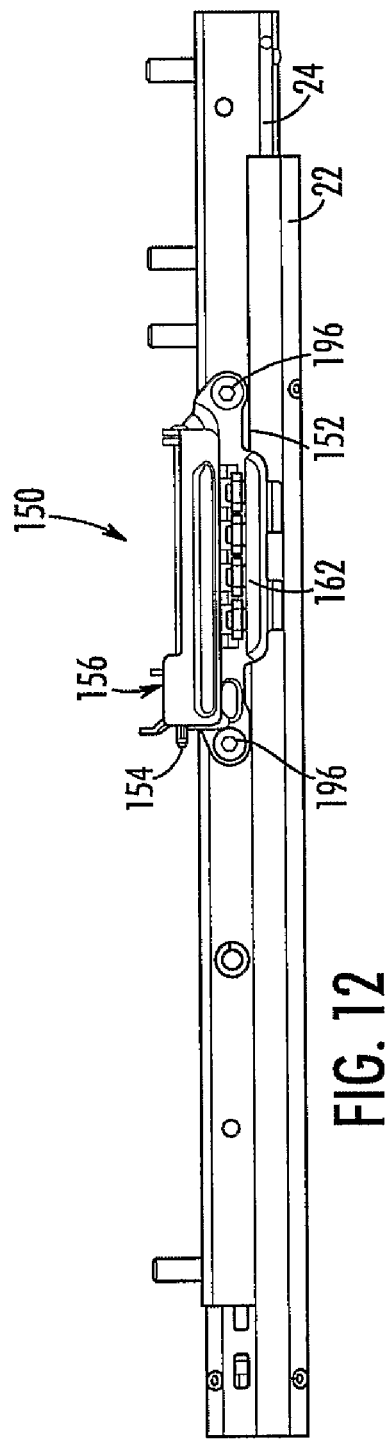
FIG. 12 is a side elevation view of a portion of a track arrangement of the track system of FIG. 8.

According to one exemplary embodiment, the size and spacing of pins 250 (including the spacing of pin apertures 176 of support structure 152, fingers 210 of actuating member 156, and pin apertures 236 of back plate 160) do not correspond exactly to the size and spacing of apertures 54b in lower track 22. Apertures 54b are generally wider than is needed to receive body portion 254 of a pin 250. As illustrated in FIGS. 9 and 14, pins 250 are sized and spaced apart such that when latch 150 is in the engaged position, one pin 250 fully engages an aperture 54b, a second pin 250 partially engages an aperture 54b, and the other two pins 250 do not engage an aperture 54b at all but rather rest against a portion of sidewall 38 of lower track 22 between apertures 54b. With respect to the pin 250 that fully engages an aperture 54b, (the primary pin), end portion 258 extends through the aperture 54b until the sharper taper area 278 of one side of pin 250 (e.g., side 264 or side 266, or generally the fore or aft side) contacts or comes close to contacting the corresponding side or wall (e.g., either fore or aft side) of aperture 54b. With respect to the pin 250 that partially engages an aperture 54b (the secondary pin), end portion 258 extends through the aperture 54b until one side of gradually tapered area 280 of pin 250 contacts one side of the aperture 54b at a point approximately half way up the gradually tapered area 280. Accordingly to various embodiments, the point at which gradually tapered area 280 contacts the side of aperture 54b may vary depending on the tolerance stack-up of the various components of latch assembly 150, lower track 22, and upper track 24. The sides of the primary pin 250 and the corresponding aperture 54b that contact one another are opposite the sides of the secondary pin 250 and the corresponding aperture 54b that contact one another. Thus, if the front edge of the primary pin 250 contacts the front side of the wall forming the corresponding aperture 54b, the rear edge of the secondary pin 250 will contact the rear side of the wall forming the corresponding aperture 54b.

According to one exemplary embodiment, each of pins 250 is configured to deflect and then eventually yield (e.g., reach its yield point) when serving as the primary pin or the secondary pin and when acted upon by a sufficient load. This ability of the primary pin or secondary pin 250 to deflect and yield allows the lower track 22 (and possibly other components of latch assembly 150) to move just enough to allow the other of the primary or secondary pin 250 (e.g., the pin serving as the backup pin) to become fully engaged with its corresponding aperture 54b. Upon the application of a sufficient load, the primary or secondary pin 250 serving as the pin initially subjected to the load will start to deflect (which of the primary pin and the secondary pin is initially subjected to the load will depend on the direction of the load), and then as the load increases, the initially loaded pin 250 will eventually reach its yield point. The deflection and yielding of the initially loaded pin 250 allows the other of the primary or secondary pin 250 (e.g., the backup pin) to move far enough away from the edge of the corresponding aperture to become fully engaged. Because the primary pin 250 and the secondary pin 250 initially engage opposite sides of their corresponding apertures 54b, no force will be applied to the primary or secondary pin 250 serving as a the backup pin until the other of the primary or secondary pin 250 serving as the initially loaded pin deflects enough to allow the backup pin 250 to contact the other side of its corresponding aperture (e.g., the same side of its corresponding aperture 54b that the initially loaded pin 250 engages). Accordingly, once a certain amount of force or load has been applied to the initially loaded pin 250, the backup pin 250 will become fully engaged with its corresponding aperture 54b and will provide additional resistance to any further movement of upper track 24 relative to lower track 22. In this way, the backup pin 250 generally serves as a backup to share the load with the initially loaded pin 250 in the event the initially loaded pin 250 is subjected to unusually high loads, such as may occur during a significant change in vehicle velocity. According to various exemplary embodiments, the pins are configured such that they reach their yield points when subjected to a force between approximately 10 kN and approximately 13 kN. According to other and exemplary embodiments, the pins may be configured so that their yield points occur at points that are suitable for the particular application of the track system.

By contacting different sides of corresponding apertures 54b, the primary pin 250 and the secondary pin 250 generally resist movement of the upper track 24 in either the forward or rearward direction relative to lower track 22. Moreover, the taper on the partially engaged pin 250 allows latch assembly 150 to adjust to the tolerances or manufacturing variances that may arise in the manufacturing of the various components of latch assembly 150 (including the tolerances, or combination of tolerances, of pins 250, support structures 152, lower tracks 22, back plates 160, etc.) by permitting the partially engaged pin 250 to extend further into, or not as far into, the corresponding aperture 54b depending on the tolerance stack up of the various components of latch assembly 150. Essentially, the taper on the partially engaged pin 250 acts as a wedge that pinches a portion of lower track 22 between the partially engaged pin 250 and the fully engaged pin 250 and that is able to account for tolerances in the various components of latch 150. This helps to reduce or eliminate any chuck or "play" between lower track 22, pins 250, and upper track 24 due to latch assembly 150. Moreover, the angle of tapered areas 280 is intended to be such that pin 250 will not tend to retract from, or pop out of, aperture 54b when acted upon by lower track 22 (or when pin 250 acts upon lower track 22).

The configuration of the four pins 250 described above and the configuration of apertures 54b in lower track 22 allows the position of upper track 24 relative to lower track 22 to be adjusted to a finer degree than the spacing of apertures 54b would otherwise allow. According to one exemplary embodiment, the four pins 250 are configured so that upper track 24 can be moved or adjusted relative to lower track 22 by increments that are approximately one-fourth of the distance between each of apertures 54b. For discussion purposes, the four pins 250 will be referred to as pins 1, 2, 3, and 4. To achieve the incremental adjustment capability, the four pins 250 are configured so that at each increment, a different pin 250 becomes the primary pin and a different pin 250 becomes the secondary pin. For example, when upper track 24 is in a first position relative to lower track 22, pins 1 and 4 are disengaged (e.g., are not aligned with an aperture 54b in lower track 22 and therefore generally rest against sidewall 76), pin 2 serves as the secondary pin, and pin 3 serves as the primary pin. When upper track 24 is moved by one increment, pin 1 becomes the secondary pin, pin 2 becomes the primary pin, and pins 3 and 4 become disengaged. When upper track 24 is moved by another increment (the second increment), pin 1 becomes the primary pin, pins 2 and 3 become disengaged, and pin 4 becomes the secondary pin. When upper track 24 is moved by another increment (the third increment), pins 1 and 2 become disengaged, pin 3 becomes the secondary pin, and pin 4 becomes the primary pin. When upper track 24 is moved by another increment (the fourth increment), the pins again return to the position were pins 1 and 4 are disengages, pin 2 is the secondary pin, and pin 3 is the primary pin.

According to other various exemplary embodiments, the latch assembly may include more or less than four pins, and the pins may be spaced and configured so that all of the pins fully engage a corresponding aperture in the lower track or so that each of the pins has a different degree of engagement ranging from fully engaged to not engaged at all. According to other various exemplary embodiments, the pins of the latch assembly may be configured to allow the upper track to be locked in position relative to the lower track at one, two, three, or more incremental positions between the positions that the spacing of apertures 54b would otherwise allow.

Figure 25:
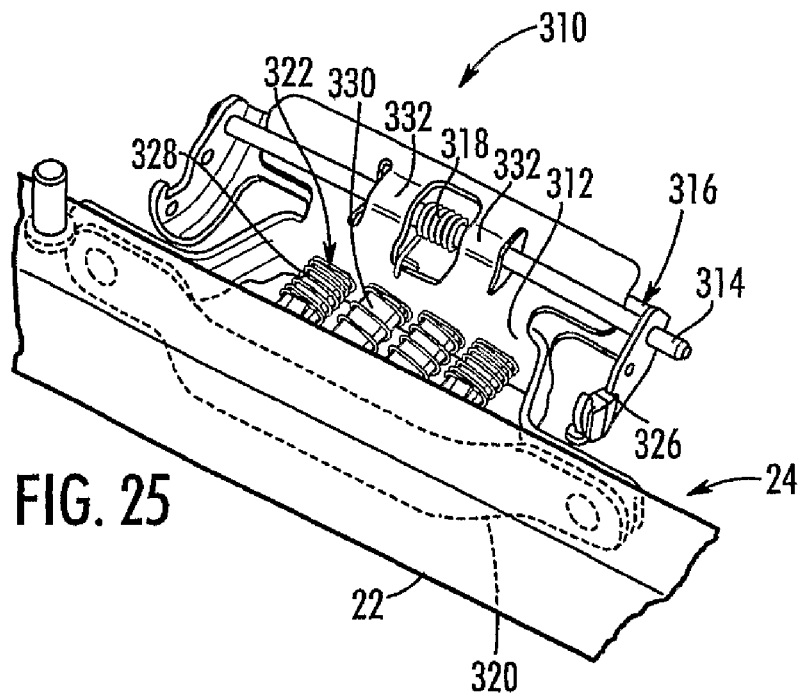
FIG. 25 is a top perspective view of a portion of a track arrangement including a latch assembly according to one exemplary embodiment.
Figure 26:
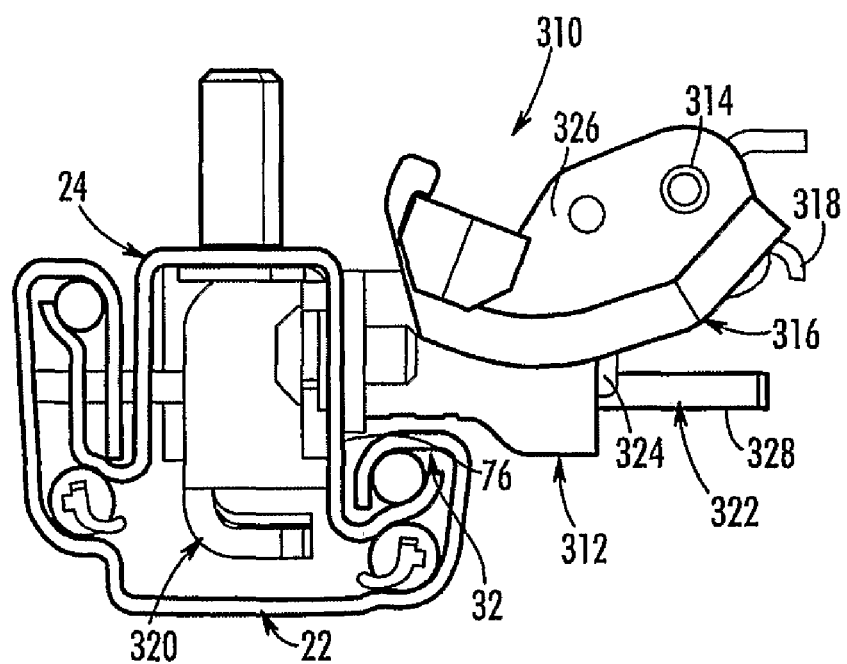
FIG. 26 is a side elevational view of the portion of the track arrangement and latch assembly of FIG. 25.
Figure 27:
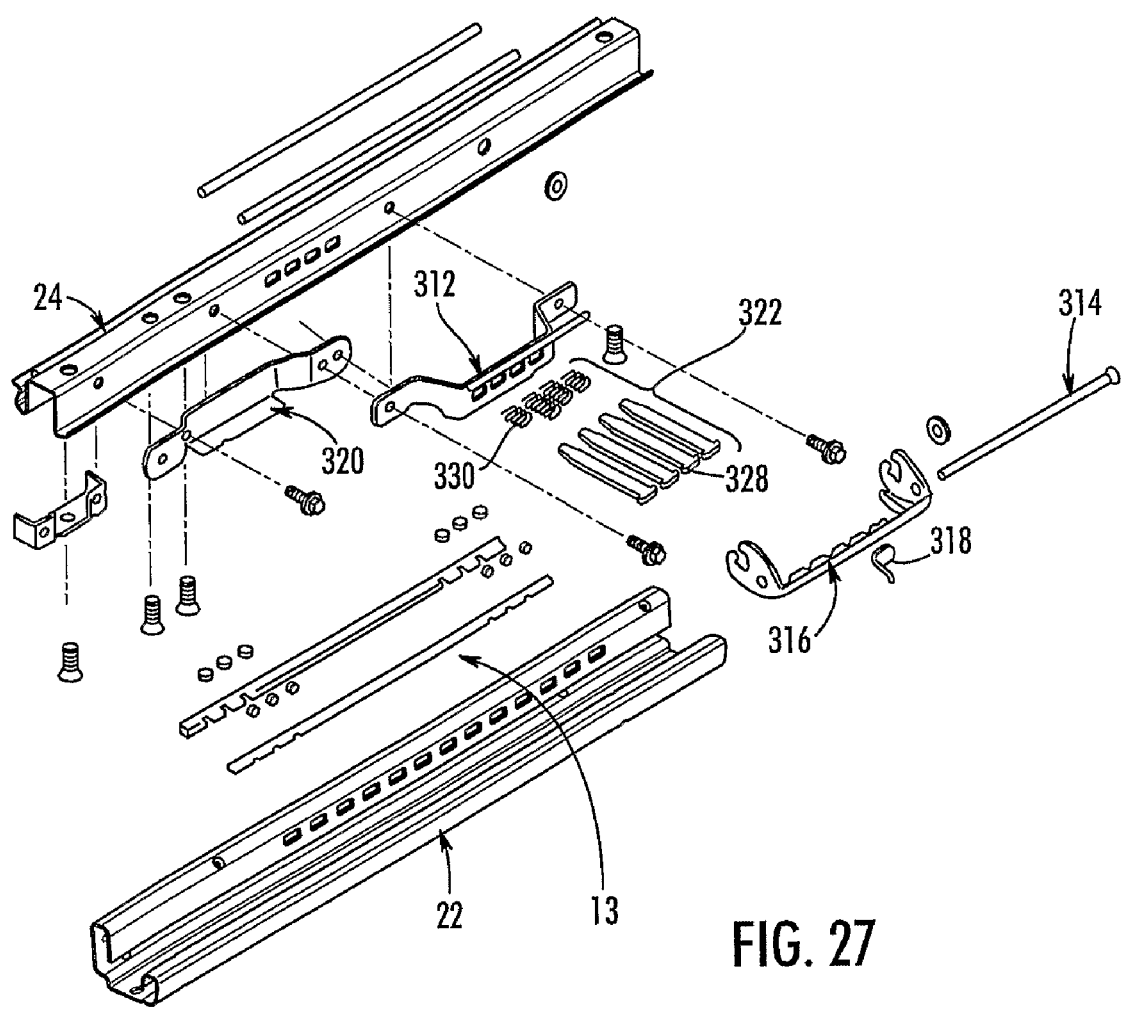
FIG. 27 is an exploded perspective view of the track arrangement and latch assembly of FIG. 25.

According to another exemplary embodiment illustrated in FIGS. 25-27, latch assembly 28 is a positive engagement latch 310. Latch 310 is generally similar to latch 150 and operates in the same general manner, but some of the components of latch 310 have different configurations than, or are illustrated as different embodiments of, the corresponding components of latch 150. Latches 150 and 310 are intended to illustrate just two of a multitude of different configurations that a positive engagement type latch of seat assembly 10 may take. Because of its similarity to latch 150, which was described above, the following description of latch 310 will be general in nature, it being understood that many of the differences between the components of latch 150 and latch 310 are apparent from a comparison of the FIGURES.

Latch 310 includes a support structure 312, a pin 314, an actuating member 316, a spring 318, a back plate 320, and a pin assembly 322. Support structure 312 is coupled to sidewall 76 of upper track 24 and generally provides the base or structure to which pin assemblies 322 and pin or shaft 314 are coupled. Shaft 314 is coupled to support structure 312, but rather than extending through apertures in two arms or ears of support structure 312 that are located near each end of the support structure as in latch 150, shaft 314 is generally located in a groove in support structure 312 and is retained in place by two raised regions 332 of support structure 312 proximate the center of shaft 314. Actuating member 316 is coupled to shaft 314 in a manner that allows it (or shaft 314) to rotate about the axis of shaft 314. Actuating member 316 includes fingers or extensions 324 that engage pin assemblies 322 and an arm 326 that is configured to be acted upon by a force and rotated around the axis of shaft 314 to retract pin assemblies 322 from their engaged positions. Each pin assembly 322 includes a pin 328 as well as a biasing device shown as a compression spring 330 that is provided in connection with each pin 328 to bias each pin 228 toward the engaged position. A biasing device shown as a helical torsion spring 318 is provided around shaft 314 between raised regions 332 of support structure 312 to bias actuating member 316 toward the engaged position. In order to disengage pins 328, the force applied to arm 326 of actuating member 316 should be sufficient to overcome the bias provided by springs 330 (of each pin assembly 322) and spring 318 (which acts upon actuating member 316).

According to one exemplary embodiment, the occupant of the vehicle seat disengages pins 328 by actuating (e.g., lifting) a bar or lever (not shown, but similar to lever 282 of latch 150) that is operatively linked to arm 326 of actuating member 316 and that is pivotably coupled to upper track 24. As the occupant lifts the bar, the lever generally rotates about the point at which it is coupled to upper track 24 (e.g., as discussed above in connection with lever assembly 21) and the end of the lever that is proximate arm 326 of actuating member 316 applies a force to arm 326 that causes actuating member 316 to rotate and fingers 324 to slide pins 328 out of engagement with apertures 54b in lower track 22.

According to various exemplary embodiments, a positive engagement type latch may take one of a variety of different shapes, sizes, and configurations and include components that may take one of a variety of different shapes, sizes, and configurations. According to various exemplary embodiments, the precise configuration of the different components of a positive engagement type latch may depend on a variety of factors, including space constraints, performance requirements, the characteristics of the seat or automobile or other environment in which the latch will be used, or one or more of a variety of other factors.

Figure 29:
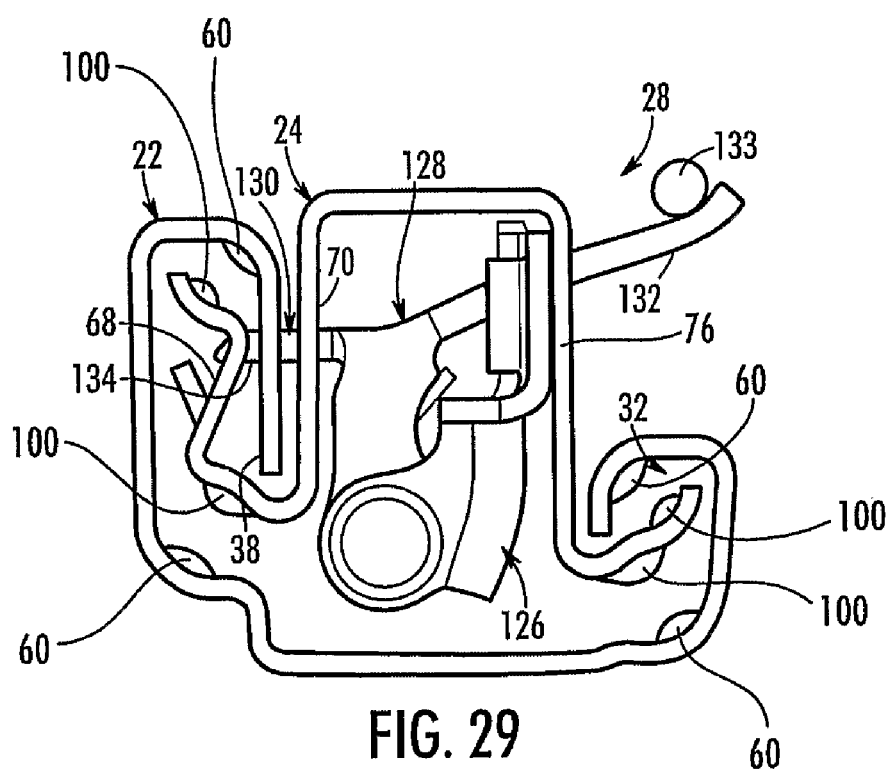
FIG. 29 is a side elevational view of the track arrangement and latch assembly of FIG. 28.

According to another exemplary embodiment illustrated in FIGS. 28 and 29, latch assembly 28 is a pawl-type latch that includes a support structure 126 that is coupled to sidewall 76 of upper track 24 and a lever or rocker 128 that is coupled to support structure 126. Support structure 126 is coupled to the interior side of sidewall 76 of upper track 24, and is generally located within channel 66 of upper track 24 and channel 34 of lower track 22. Support structure 126 generally provides the fulcrum about which lever 128 pivots. Lever 128 includes a working portion 130 (e.g., a pin or member) and an actuating portion 132 and pivots between an engaged position and a disengaged position. Working portion 130 includes four fingers or projections 134 that extend through an aperture or apertures in sidewall 70 of upper track 24, through corresponding apertures 54 (e.g., apertures 54a) in sidewall 38 of lower track 22, and at least partially into apertures in sidewall 68 of upper track 24 when lever 128 is in the engaged position. As shown in FIG. 29, working portion 130 extends between the location where the bearings are provided (FIG. 29 shows the locations of the stops 60 and 100, which correspond to the location of the bearings in cross-section). In this manner, the position of the working portion relative to the bearings provides added stability when the working portion is in the engaged position. In the disengaged position, lever 128 is pivoted so that projections 134 no longer extend through or into corresponding apertures 54 in sidewall 38 of lower track 22 or the aperture or apertures in sidewall 68 of upper track 24. Actuating portion 132 of lever 128 extends through an aperture in sidewall 76 of upper track 24 (e.g., aperture 82) and is configured to be acted upon by a force to move lever 128 from the engaged position to the disengaged position. The distance sidewall 76 extends above the top of inner channel 32 provides enough clearance to enable actuating portion 132 to be fully actuated without touching the top of inner channel 32. Lever 128 is generally biased toward the engaged position, so the force applied to actuating portion 132 must be sufficient to overcome the bias in order to move lever 128 and fingers 134 into the disengaged position.

According to one exemplary embodiment, the occupant of the vehicle seat disengages projections 134 by actuating (e.g., lifting) a bar (not shown) that is operatively linked to actuating portion 132 of lever 128 by a linkage or lever 133 that is pivotably coupled to upper track 24. As the occupant lifts the bar, linkage 133 generally rotates about the point at which it is coupled to upper track 24 (e.g., the pivot of linkage 133 may be included as a feature on upper track 24) and the end of linkage 133 that is proximate actuating portion 132 applies a force to actuating portion 132, which in turn causes lever 128 to pivot to the point where projections 134 no longer extend through or into corresponding apertures 54 in sidewall 38 of lower track 22 or the aperture or apertures in sidewall 68 of upper track 24.

According to various exemplary embodiments, the latch assembly may be any type of latch assembly. According to other various exemplary embodiments, the latch assembly may include one, two, three, five, or more than five pin assemblies (and the upper and lower tracks may be configured to include a different number of apertures to coordinate with the number of pins of the latch assembly). According to still other various exemplary embodiments, the shape, size, or configuration of the pin assemblies may vary, and the shape, size, or configuration of one pin assembly of the latch assembly may differ from the shape, size, or configuration of a different pin assembly of the same latch. According to still other exemplary embodiments, the shape, size, and configuration of the various components of the latch assembly may vary depending on the characteristics of the upper and lower track, the environment in which the latch assembly will be used, manufacturing considerations, and one or more of a variety of other factors. According to still other various exemplary embodiments, a powered apparatus, such as a solenoid, may be used to engage or disengage the latch assembly. According to still other various exemplary embodiments, the different latch assemblies may be coupled to the track assembly at various locations (e.g., on sidewall 76, intermediate wall 80, sidewall 36, base 48, or other locations) and may be oriented generally horizontally, diagonally, or generally vertically relative to the track assembly or arrangement. According to still other exemplary embodiments, only one of the two (or potentially more) track arrangements of the track system may include a latch assembly. According to other exemplary embodiments, the latch assemblies may be provided on the track arrangements so that they are located on the outside of the seat assembly rather than on the inside.

According to another exemplary embodiment illustrated schematically in FIGS. 1, 2, 30, and 31, the movement of track arrangement 18 is powered by a source of power other than the occupant (e.g., the movement of upper track 24 relative to lower track 22 is provided by an electrical power source such as an electrical motor powered by the battery of an automobile). According to this embodiment, track arrangement 18 includes a lower track 22 and an upper track 24 as described above. In addition, track arrangement 18 includes a motion transfer apparatus, generally located within chamber 81 and coupled between lower track 22 and upper track 24, that is configured to transfer the rotary motion of an electric motor (not shown) into translational motion. According to one exemplary embodiment of track arrangement 18, the motion transfer apparatus includes a power screw 136 that is coupled to lower track 22 and a nut 138 that is coupled to upper track 24. The electric motor is operatively coupled to nut 138 and has gears that cause it to rotate relative to power screw 136. As nut 138 rotates relative to power screw 136, it moves either forward or backward along the length of power screw 136, depending on the direction of the rotation. Because nut 138 is coupled to upper track 24 and power screw 136 is coupled to lower track 22, upper track 24 moves (e.g., translates) relative to lower track 22 to the same degree that nut 138 moves (e.g., translates) relative to power screw 136. According to various exemplary embodiments, the nut may be coupled to the lower track and the power screw may be coupled to the upper track. According to other various exemplary embodiments, the nut, power screw, and motor may be configured such that the nut rotates around a stationary power screw, the power screw rotates within a stationary nut, or both the nut and the power screw rotate relative to one another. According to other various exemplary embodiments, other motion transfer apparatuses or devices (e.g., hydraulic or pneumatic cylinders, linear motors, etc.) may be used to control the movement of the upper track with respect to the lower track.

The track assemblies described above provide a relatively simple, durable, solid, and efficient structure for adjusting the position of a vehicle seat in the forward and rearward direction and may provide a number of advantages over other systems. The design of the track assembly allows the same basic tracks (e.g., tracks having the same cross-section) to be used regardless of whether the track is used with a pawl-type latching mechanism, a PEL-type latching mechanism, a powered translational motion device, or one of a variety of other latching mechanisms. The design of the track assembly also provides a relatively stable and strong structure to retain the vehicle seat in a particular position. When the upper and lower tracks are used in combination with a latching device, the tracks may be configured such that the pin of the latching device is retained and guided on both sides (e.g., by apertures in sidewalls 68 and 70) of the structure of the lower track that includes the aperture that serves to fix the translational position of the pin (e.g., aperture 54 in sidewall 38 of lower track 22).

When a pawl-type latch is used and the upper track attempts to move relative to the lower track (such as when an occupant sits on the seat), a force is applied to each pin on both sides of sidewall 38, which subjects the pin to a double shear situation. This arrangement tends to provide stability and strength to the track assembly. The stability of the track arrangement is also improved by the use of four sets of bearings. The four sets of bearings not only maintain the upper track in the proper position relative to the lower track, but the positioning of the bearings on either side of the latch windows or apertures (particularly latch windows 54) provides additional stability to the track system.

By incorporating the latch windows or apertures in the lower track, rather than in a separate structure that is then coupled to the lower track, fewer parts are required for the track assembly, which tends to reduce the weight of the overall system and reduce the likelihood of failure. Moreover, the incorporation of apertures that are closed on all sides (e.g. surrounded by material on all sides), rather than apertures that are surrounded by material on only three sides, allows the track assemblies to be roll-formed or stamped, which facilitates manufacturing.

The portion of sidewall 76 of upper track 24 that extends above the top of inner channel 32 allows a latch assembly to be coupled to the side of the track assembly, rather than to the top or bottom, and to engage horizontal latch windows provided on the lower track. This facilitates the coupling of the track assembly to a seat when there are space constraints above and/or below the track assembly. It also reduces the extent to which the seat cushion brackets (which couple the seat to the track arrangements) have to be packaged around the latch assemblies, which may allow the seat cushion brackets to be less complicated and less difficult to manufacture. The horizontal orientation of the latch assembly also helps to avoid the possibility that debris that finds its way under or above either of the track arrangements could prevent the pins of the latch assembly from fully engaging the lower track. The portion of sidewall 76 above the top of inner channel 32 also provides enough room for an actuating member of certain types of latch assemblies to extend through sidewall 76 and further provides enough clearance to enable the actuating member to be fully actuated. Moreover, the generally horizontal orientation of the pins or fingers of the latch assembly helps to reduce the sensitivity of the latch assembly to the vertical accelerations a vehicle may encounter during its normal operation as a result of the vehicle's suspension system being oriented predominantly vertically. As a vehicle travels over the road, the vehicle's suspension system absorbs and releases energy, which in turn subjects the vehicle to vertical accelerations that are ultimately transferred to the track system. The vertical accelerations the track system experiences could drive vertically oriented pins at least partially or temporarily out of engagement with the lower track, which increases the potential for buzzes, squeaks, and rattles, or even total disengagement if the accelerations are excessive. The horizontal orientation of the pins or fingers of the latch assemblies described herein helps to reduce or minimize these potential problems.

The fact that the pins or fingers of the latch assembly engage the apertures of the lower track at a location that is generally within the interior or cross-section of the overall track arrangement helps to protect the interface between the pins and the lower track from interference and serves to generally increase the durability and reliability of the track system.

It is important to note that the term "seat" is intended to be a broad term and not a term of limitation. According to various exemplary embodiments, the seat track system or arrangement may be used with any of a variety of seats, assemblies, or arrangements and is not intended to be limited to use with automobile seating, but may be used with any seating where the seat is intended to be adjusted (e.g., selectively arranged between a forward and rear position). For example, the seat may be vehicle seating or any of a variety of seat assemblies used in airplanes, trains, buses, homes, offices, theaters, or anywhere a seated person may wish to adjust his or her seated position. According to various other exemplary embodiments, the track system may be used with structures other than seats and may be coupled to the floor of a building, dwelling, or other type of structures, or one of a variety of other types of object or structures.

Those reviewing this disclosure will appreciate that various advantageous features may be included in the track systems as described and shown in the various exemplary embodiments. For example, one such advantageous feature is that the track systems may relatively stable and may be produced with a lesser number of separate parts as compared to conventional track systems.

The track systems are relatively strong and may be manufactured using a variety of manufacturing processes. The track systems provide for the convenient placement of a latch mechanism and facilitate the incorporation of the track system into seat assemblies. The track system may be used with different latching mechanisms.

According to an exemplary embodiment as described herein, a track system or arrangement includes a lower track that is configured to be coupled to the vehicle and an upper track that couples to the lower track in a manner that allows the upper track (and a seat that is coupled to the upper track) to move relative to the lower track. The lower track includes an outer, downwardly facing channel; an inner, downwardly facing channel that is approximately half the height of the outer channel; and an intermediate, upwardly facing channel formed by the outer channel and the inner channel. The upper track includes an outer, upwardly facing channel; an inner, upwardly facing channel; and an intermediate, downwardly facing channel formed by the outer channel and the inner channel.

When coupled together, the outside channel of the upper track interlocks with the outside channel of the lower track; the inside channel of the upper track interlocks with the inside channel of the lower track; and the intermediate channel of the upper track is generally aligned with the intermediate channel of the lower track to form a generally enclosed volume between the upper track and the lower track. In the coupled condition, the height of the outer channel of the lower track is approximately equal to the height of the intermediate channel of the inner track. However, the height of the inner channel of the lower track is approximately half the height of the intermediate channel of the inner track.

To facilitate the movement of the upper track relative to the lower track and to add stability and integrity to the track system, bearings are placed between the upper track and lower track at four locations around the cross-sectional profile of the track system: at the top of the outer channel of the lower track, at the bottom of the outer channel of the lower track, at the top of the inner channel of the lower track, and at the bottom of the inner channel of the lower track.

According to one exemplary embodiment, a latch assembly is coupled in a generally horizontal orientation to the inwardly facing side (relative to the track system rather than the vehicle) of the intermediate channel of the upper track, and is generally located above the inner channel of the lower track. Both the upper track and the lower track include a series or pattern of apertures (e.g., latch windows) that cooperate with one another to receive a pin from the latch assembly that releasably locks the upper track in a particular position with respect to the lower track. The apertures in the lower track are intermittently spaced and generally extend along the entire length of the lower track. The apertures in the upper track generally extend across the width of the upper track and are located where the latch assembly is coupled to the upper track. When the position of the upper track is locked with respect to the lower track, the pin or pins of the latch assembly extend through the aperture or apertures in the upper track as well as through the particular aperture or apertures in the lower track that happen to align with the aperture or apertures in upper track when the upper track is at a particular location. A lever assembly is operatively coupled to the latch assembly and is configured to release the latch assembly and allow the upper track to move relative to the lower track when the occupant of seat to which the upper track is coupled actuates the lever assembly.

The size, shape, configuration, and other characteristics of the different components of the track arrangement may be varied to give the track arrangement any one or more of a variety of different characteristics suitable for a particular application. The features of the track arrangement described above allow for a reduction in the number of different parts of the track arrangement. These features also make it possible to produce a generally stronger track arrangement that may be used with a variety of different types of latch mechanisms. In addition, these features make it possible to manufacture the track arrangement using techniques that could not be used to manufacture other track arrangements. Other ways in which the various features of the present invention can be accomplished will be described later herein, and still others will appear to those skilled in the art after they have read this specification. Such other ways are deemed to fall within the scope of the present invention, if they fall within the scope of any claims that may be provided.

It is important to note that the construction and arrangement of the elements of the track system or arrangement as shown in the exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, a variety of configurations may be provided for the upper track and the lower track. Accordingly, all such modifications are intended to be included within the scope of the present invention as defined in the appended claims. The order or sequence of any process or method steps may be varied or re-sequenced according to other exemplary embodiments. Other substitutions, modifications, changes and omissions may be made in the design, operating conditions and arrangement of the preferred and other exemplary embodiments without departing from the spirit of the present inventions as expressed in any appended claims.

What is claimed is:

1. A track assembly for a vehicle seat comprising:
a first track having a first portion;
a second track coupled to the first track, the second track having a first portion and a second portion, the first portion of the first track provided between the first and second portions of the second track;
a first set of friction reducing members provided at a first location between the first track and the second track to facilitate sliding movement of the second track relative to the first track;
a second set of friction reducing members provided between the first track and the second track to facilitate sliding movement of the second track relative to the first track; and
a device for preventing the sliding movement of the second track, the device comprising a pin configured to lock the second track in place relative to the first track by engaging the first portion of the first track, the first portion of the second track, and the second portion of the second track;
wherein the pin extends between the first set of friction reducing members and the second set of friction reducing members when the second track is prevented from sliding, and
wherein friction reducing members in the first and second sets of friction reducing members are free to move along the length of the first and second tracks past the device for preventing the sliding movement.

2. The track assembly of claim 1, wherein the device comprises a lever for moving the pin between a first position in which the second track is locked in place relative to the first track and a second position in which the second track is free to move relative to the first track.

3. The track assembly of claim 2, further comprising a spring for biasing the pin in the first position.

4. The track assembly of claim 1, wherein the device for preventing the sliding movement of the second track comprises a plurality of pins configured to lock the second track in place relative to the first track.

5. The track assembly of claim 1, wherein the first set of friction reducing members and the second set of friction reducing members are provided at a first side of the track assembly and further comprising a third set of friction reducing members and a fourth set of friction reducing members provided at a second side of the track assembly.

6. The track assembly of claim 5, wherein the first set of friction reducing members is separated from the second set of friction reducing members by a first distance and the third set of friction reducing members is separated from the fourth set of friction reducing members by a second distance, the first distance being greater than the second distance.

7. The track assembly of claim 1, wherein the first track comprises an upwardly facing channel provided between and in communication with a first downwardly facing channel and a second downwardly facing channel.

8. The track assembly of claim 7, wherein the second track comprises a downwardly facing channel provided between a first upwardly facing channel and a second upwardly facing channel.

9. The track assembly of claim 8, wherein the upwardly facing channel of the first track is generally aligned with the downwardly facing channel of the second track.

10. The track assembly of claim 8, wherein the first set of friction reducing members is provided within both the first downwardly facing channel of the first track and the first upwardly facing channel of the second track.

11. The track assembly of claim 10, wherein the second set of friction reducing members is provided below the first upwardly facing channel of the second track.

12. A track assembly for a vehicle seat comprising:
a first track comprising an upwardly facing channel, a first downwardly facing channel, and a second downwardly facing channel, the upwardly facing channel provided between and in communication with the first and second downwardly facing channels;
a second track configured for sliding movement relative to the first track and comprising a downwardly facing channel, a first upwardly facing channel, and a second upwardly facing channel, the downwardly facing channel of the second track provided between and not in communication with the first and second upwardly facing channels, wherein the upwardly facing channel of the first track is generally aligned with the downwardly facing channel of the second track, a first portion of the second track is received within the first downwardly facing channel of the first track, and a second portion of the second track is received within the second downwardly facing channel of the first track; and
four sets of bearings provided between the first track and the second track to facilitate the sliding movement of the second track;
wherein a first set and a second set of bearings of the four sets of bearings are provided adjacent the first portion of the second track and a third set and a fourth set of the four sets of bearings are provided adjacent the second portion of the second track;
wherein the first set of bearings is separated from the second set of bearings by a first distance and the third set of bearings is separated from the fourth set of bearings by a second distance, the first distance being greater than the second distance, and
wherein bearings in the first and second sets of bearings or bearings in the third and fourth sets of bearings are free to move along the length of the first and second tracks.

13. The track assembly of claim 12, wherein the first portion of the second track has a generally Z-shaped cross-section.

14. The track assembly of claim 12, wherein the third and fourth sets of bearings are provided on opposite sides of the second portion of the second track proximate each other.

15. The track assembly of claim 12, wherein the first and second sets of bearings are provided on opposite sides of the first portion of the second track and separated such that the first portion of the second track extends between the first and second sets of bearings.

16. The track assembly of claim 12, further comprising a device for preventing the sliding movement of the second track, the device comprising a pin configured to lock the second track in place.

17. The track assembly of claim 16, wherein the pin is configured to extend through the first portion of the second track between the first set of bearings and second set of bearings to lock the second track in place relative to the first track.

18. The track assembly of claim 17, wherein a first portion of the first track is provided between the first portion of the second track and a third portion of the second track, and the pin extends through the first portion of the first track, the first portion of the second track, and the third portion of the second track to lock the second track in place.

19. The track assembly of claim 18, wherein the device comprises a lever for moving the pin between a first position in which the second track is locked in place relative to the first track and a second position in which the second track is free to move relative to the first track.

20. The track assembly of claim 19, further comprising a spring for biasing the pin in the first position.

21. The track assembly of claim 16, wherein the device for preventing the sliding movement of the second track comprises a plurality of pins configured to lock the second track in place relative to the first track.

* * * * *